(12) United States Patent
Kondou et al.

(10) Patent No.: US 7,555,764 B2
(45) Date of Patent: Jun. 30, 2009

(54) CARTRIDGE AND SHUTTER USED IN THE SAME

(75) Inventors: Hiroya Kondou, Okayama (JP); Kaoru Kajita, Okayama (JP); Yoshinori Shiomi, Okayama (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 10/595,112

(22) PCT Filed: Feb. 24, 2005

(86) PCT No.: PCT/JP2005/003062

§ 371 (c)(1),
(2), (4) Date: Feb. 20, 2006

(87) PCT Pub. No.: WO2005/083711

PCT Pub. Date: Sep. 9, 2005

(65) Prior Publication Data

US 2007/0089119 A1 Apr. 19, 2007

(30) Foreign Application Priority Data

Feb. 26, 2004 (JP) .............................. 2004-051081

(51) Int. Cl.
*G11B 23/03* (2006.01)
(52) U.S. Cl. ...................................... 720/739
(58) Field of Classification Search ................ 720/734, 720/738, 739; 360/133; 369/291
See application file for complete search history.

(56) References Cited

U.S. PATENT DOCUMENTS

| | | | |
|---|---|---|---|
| 4,945,530 A | | 7/1990 | Sandell et al. |
| 4,991,048 A | * | 2/1991 | Ikebe et al. .................. 360/133 |
| 5,793,742 A | * | 8/1998 | Sandell et al. ............... 720/734 |
| 5,903,542 A | | 5/1999 | Sandell et al. |
| 6,157,517 A | * | 12/2000 | Kishida ....................... 360/133 |
| 6,212,038 B1 | * | 4/2001 | Kishida ....................... 360/133 |
| 2001/0014078 A1 | * | 8/2001 | Sawada et al. ............... 369/291 |

(Continued)

FOREIGN PATENT DOCUMENTS

| EP | 1132916 | 9/2001 |
|---|---|---|
| JP | 59036880 | 2/1984 |

(Continued)

OTHER PUBLICATIONS

The corresponding European Search Report dated Mar. 12, 2008.

*Primary Examiner*—Tianjie Chen
(74) *Attorney, Agent, or Firm*—Snell & Wilmer L.L.P.

(57) ABSTRACT

The shutter member (1) is a shutter member used in a cartridge having a case member. The case member includes a medium storage section for storing an information medium having an information layer and a window section configured to allow at least a head to be inserted. The head is used to perform a recording operation or a reproduction operation for the information layer. The shutter member (1) includes a base member (2) operable to slide along a sidewall of the case member and a plate member (3) engaged with the base member (2). The plate member (3) is operable to open/close the window section of the case member in accordance with a sliding motion of the base member (2). The base member (2) and the plate member (3) are engaged with each other such that the plate member (3) can be removed from the base member (2).

12 Claims, 23 Drawing Sheets

U.S. PATENT DOCUMENTS

| | | | |
|---|---|---|---|
| 2001/0014079 A1* | 8/2001 | Kikuchi et al. | 369/291 |
| 2006/0095934 A1* | 5/2006 | Kobayashi et al. | 720/738 |
| 2006/0143642 A1* | 6/2006 | Kawasaki et al. | 720/738 |

FOREIGN PATENT DOCUMENTS

| | | |
|---|---|---|
| JP | 61167077 | 10/1986 |
| JP | 63157874 | 6/1988 |
| WO | WO 98/38633 | 9/1998 |

* cited by examiner

CARTRIDGE AND SHUTTER USED IN THE SAME

TECHNICAL FIELD

The present invention relates to a cartridge for storing an information medium having a data area in which recording and/or reproduction (hereafter, recording/reproduction) can be performed for a user information signal, and a shutter member used in the cartridge.

BACKGROUND ART

FIG. 18 is an oblique perspective view of a case member 100 of a cartridge. The case member 100 includes an upper half 103 and a lower half 104. Each of the upper half 103 and the lower half 104 has a thickness of about a half the thickness of the case member 100. They provide a medium storage section 102 for storing an information medium 101. The upper half 103 and the lower half 104 are welded with a method such as ultrasonic welding after the information medium 101 is placed in the medium storage section 102.

In general, each of the upper half 103 and the lower half 104 has a sliding surface 106 having a window section 105. The window section 105 has a generally U-shaped opening configured to allow a rotation driving means (not shown) and a head (not shown) to be inserted. The rotation driving means drives the rotation of the information medium 101. The head is used to send/receive user information for the information layer of the information medium 101.

The sliding surface 106 is depressed from the side surface 107 by about the thickness of the shutter member described below. The side surface 107 defines the thickness of cartridge including the upper half 103 and the lower half 104. The sliding surface 106 is a sliding surface on which a plate member of the shutter member for opening/closing the window section 105, and has a pair of open position determination sections 108 which defines an opening range of the shutter member.

When the cartridge includes a shutter member which slides only one side of the cartridge, it is possible that the sliding surface 106 has only one of the open position determination sections 108.

The case member 100 has a sliding sidewall 109 which is engaged with the sliding section of the shutter member such that the sliding section of the shutter member slides on the sliding side wall 109. The side wall 109 is located at the opening side of the window section 105 having the U-shaped opening.

The locking rib 110 coupled to a cutout of the sliding sidewall 109 restricts the separation of the sliding section of the shutter member from the case member 100.

The case member 100 has a shutter block section 111 which restricts the separation of the opposite edge of the sliding section of the shutter member away from the case member 100 in the direction of the thickness of the case member 100.

FIG. 19 is an oblique perspective view of the structure of the shutter member 200 which slides along the sliding sidewall 109 so as to open/close the window section 105.

The shutter member 200 includes a sliding section 201 which slides on the sliding sidewall 109 and plate sections 202 which opens/closes the window section 105. A shutter opener engaging section 203 is provided on an outer surface of the sliding section 201. The shutter opener engaging section 203 engages with a shutter opener (not shown) which slides on the shutter member 200 along the direction of sliding sidewall 109. Hook sections 204 and a guide protrusion section 205 are provided on an inner surface of the sliding section 201. Each of the hook section 204 has a hook which engages with the locking rib 110. The guide protrusion section 205 guides the sliding direction towards the sliding sidewall 109.

The edges 206 of the plate sections 202, which are located opposite side against the sliding section 201, engage with the shutter block section 111.

For example, when the shutter opener is provided on the sidewall of the case member, it is not necessary that the shutter opener engaging section 203 is provided on the outer surface of the sliding section 201.

Furthermore, the hook sections 204 are not essentially required so long as the shutter block section 111 and the opposite edges 206 are engaged with each other by some sort of hooking structure. In this case, the shutter member 200 would not detach from the case member 100.

Similarly, the guide protrusion section 205 is not essentially required, when the accuracy of the width of the sliding section 201 along a direction perpendicular to the sliding direction is sufficiently high and the accuracy of the width of the sliding surface 106 provided on the upper half 103 and the lower half 104 along the thickness direction of the case member is sufficiently high.

However, in general, the opposite edges 206 are processed to have a thin thickness in order to insert the opposite edges 206 underneath the shutter block sections 111. It is difficult to form a hook on the thin part. Furthermore, the accuracy of the widths described above are too high, the sliding property may be degraded. Therefore, in general, the hook sections 204 and the guide protrusion section 205 are provided on the inner surface of the sliding section 201.

In assembling a conventional cartridge having the structure above, the information medium 101 is stored in the medium storage section in the case member 100, the upper half 103 and the lower half 104 are fixed by means of welding and the like, the hook sections 204 and the locking rib 110 are engaged with each other by inserting the shutter member 200 from the sliding sidewall 109 of the case member 100, and then the opposite edges 206 are warped to engage with the shutter block sections 111. Thus, the assembly of the cartridge has been completed.

A method for producing the sliding section 201 and the plate sections 202 as a single unit, as its the shutter member 200 shown in FIG. 19, is disclosed in Reference 1, for example. In the method, three separate molds (i.e. a rigid mold, a flexible mold and a slide core) are used, the flexible mold and the slide core are separated from the rigid mold by injecting acetal resin and the like between the molds. Thus, the shutter member having a single piece integrating the sliding section and the plate sections can be obtained.

Reference 2 discloses a method for assembling the shutter member and the case member. In the method, a shutter part, including a sliding section, a plate section and a protrusion section which engages with a groove in the main surface of the case member, and another plate section are assembled onto the case member, and then the positioning protrusion section on the sliding section and the positioning depression section on the other plate section are engaged with each other, and then the melting protrusion section on the sliding section and the melting depression section on the other plate section are engaged as well as welded.

Reference 3 discloses a method for assembling the shutter member and the case member. In the method, the shutter member is divided at the substantially central portion of the thickness of the upper half and lower half of the case member, each of the divided portions of the shutter member has a sliding section, a plate section, and a protrusion section which engages with a groove in the main surface of the case member, the positioning protrusion section and depression section on the sliding section are engaged with each other onto the case member, and then the melting protrusion section and depression section on the sliding section are engaged as well as welded.

Furthermore, Reference 4 discloses a cartridge including a case member and a shutter member. The case member has a lower case, a stationary lid and a movable lid. The shutter member has a sliding section, a plate section provided on one side of the sliding section, and a non-rotatable plate section provided on the other side of the sliding section, and a rotatable plate section which engages with the non-rotatable plate section.

By rotating the rotatable plate section around the rotary shaft by 270 degrees while the hinge pin on the rotatable plate section and the C-shaped retainer on the lower case are engaged with each other, it is possible to take the information medium from the cartridge.

The sliding section and the plate section are fixed by engaging the L-shaped engaging depression section on the sliding section at the side of the lowercase with the L-shaped engaging projection section on the plate section for opening/closing the window section on the lower case, along the sliding direction of the sliding section.

The sliding section and the non-rotatable plate section are fixed by engaging the L-shaped engaging depression section of the sliding section at the side of the lid with the L-shaped engaging projection section on the non-rotatable plate section, along the sliding direction of the sliding section.

The non-rotatable plate section and the rotatable plate section are rotated around the ribs as the rotary shafts by engaging the hemispherical depression section on the rib of the non-rotatable plate section with the hemispherical protrusion section on the rib protruding from the rotatable plate section. The rotatable plate section is rotated around the rotary shaft of the shutter member in connection with the rotary shaft of the case member.

Reference 1: Japanese laid-open patent publication No. 3-259884 (page 3, right lower column, line 13 to page 4, left lower column, line 2, and FIGS. 4 and 5).

Reference 2: Japanese laid-open patent publication No. 11-3577 (Paragraph 0040 and FIG. 11)

Reference 3: Japanese aid-open patent publication No. 2000--285630 (Paragraphs 0023-0025 and FIG. 1)

Reference 4: Japanese National Phase PCT Laid-open Publication No. 2001-513935 (page 23, line 29 to page 25, line 1 and FIGS. 2-9)

The shutter member 200 includes a thin plate section 202 having a thickness of about 1 mm, and a sliding section 201 having a complicated shape which engages with the sliding sidewall 109 of the case member 100 such that the sliding section 201 slides on the sliding sidewall 109.

In the shutter member 200 having the plate section 202 and the sliding section 201 integrally molded using a method such as injection molding, there are problems such as the reduction of the planarity of the plate section 202 by the occurrence of local warps on the plate section 202, the difficulty in controlling the angle between the sliding section 201 and the plate section 202, which tends to be too sharp or too blunt, or the reduction of the parallelism of the surface of the plate section 202 against the sliding section 201 in the sliding direction, due to the internal stress caused by the temperature difference in the injection molded products and the mold-releasing force when the injection molded shutter member 200 is released from the mold. There is also a problem of low yield of the shutter member 200.

Even if the molding method described in Reference 1 is used, for example, there remains a problem of the difficulty in molding a shutter member precisely as designed, due to a persistent internal stress caused by the temperature difference, when the mold is released by moving the flexible mold and the slide core away from the rigid mold. Specifically, when the planarity of the plate section 202 is reduced, the warped portion of the plate section 202 produces gaps between the plate section and the side edges of the window section 105. This may cause the entry of dusts into the cartridge, or the loss of the function of the shutter member 200 by terminating the sliding motion of the shutter member 200 on the sliding surface 106 due to the edges of the plate 202 being in contact with the side edges of the window section 105.

Furthermore, the boundary surface between the sliding section and the plate section has an inconsistent thickness, and therefore, the significant temperature difference is caused on the boundary surface when the mold is released. Accordingly, even if the planarity of the plate section 202 is favorable, the angle between the sliding section 201 and the plate section 202 may be too sharp or too blunt. In this case, the following problem is frequently caused when the shutter member 200 is fitted onto the case member 100. Specifically, when the angle between the sliding section 201 and the plate section 202 is close to 90 degrees as shown in FIG. 20A, the plate section 202 becomes parallel to the sliding surface 106 when the shutter member is fitted onto the case member 100. In this case, the sliding motion is not prevented, since the plate section 202 is not in contact with the window section 105, for example. For this reason, the angle between the sliding section 201 and the plate section 202 is designed to be close to 90 degrees.

However, there may occur a case where the angle between the sliding section 201 and the plate section 202 is less than 90 degrees (i.e. sharp angle) as shown in FIG. 20B, or the angle between the sliding section 201 and the plate section 202 is greater than 90 degrees (i.e. blunt angle) as shown in FIG. 20C, due to the internal stress caused by the temperature difference in the shutter member 200 when the mold is released in the integral molding step described above.

When the shutter member 200 is fitted onto the case member 100 with the sharp angle between the sliding seotlon 201 and the plate section 202 as shown in FIG. 20B, the opposite edges 206 and/or vicinity of the opposite edges 206 is in contact with the sliding surface 106. This causes the difficulty in fitting the shutter member 200 onto the case member 100 and also causes scratches on the information layer of the information medium 101 due to the entry of the opposite edges 206 from the window section 105.

On the other hand, when the shutter member 200 is fitted onto the case member 100 with the blunt angle between the sliding section 201 and the plate section 202 as shown in FIG. 20C, there is no risk for providing any contact with the sliding surface 106 or providing any scratch on the information medium. However, due to the resistance against the force which attempts to shorten the distance of engagement between the shutter block section 111 and the opposite edges 206, there occurs problem that the opposite edges 205 come off of the shutter block section 111 when shutter member 200 slides, and/or, the pair of plate sections 202 fit the sliding surface 106 at the vicinity of sliding section 201 and at the vicinity of the shutter block section 111, but the plate section 202 is curved outward in the middle such that the plate section 202 does not cover the window section 105 as a flat surface.

Accordingly, when the angle between the sliding section 201 and the plate section 202 is significantly shifted from 90 degrees, it is necessary to correct the angle between the sliding section 201 and the plate section 202, before the shutter member 1 is fitted onto the case member 100. However, as described above, the thickness of the plate section 202 is about 1 mm. Therefore, the planarity of the plate section 202 may often be lost, or the plate section 202 and the sliding section 201 may often be broken at the joint portion, due to the forces applied to the plate section 202 in order to correct the angle between the sliding section 201 and the plate section 202. There is also a problem of low yield of the shutter member 200.

Furthermore, even if the angle between the sliding section 201 and the plate section 202 is corrected, immediately after the correction is made, the internal stress, once generated, causes revert this angle back to its original angle over time. Therefore, the correction of the angle between the sliding section 201 and the plate section 202 is not so reliable.

Additionally, in order to enhance the visibility for the users, of the various information such as the distinction between the information medium having the information layers on both sides and the information medium having the information layer on only one side, the distinction between the surface A and the surface B in the information medium having the information layers on both sides, and/or the capacity and the type of the information medium stored in the cartridge, a mat process (or embossed process) is performed on a surface of the plate section 202, which is opposite to the surface facing the sliding surface 106 so that a fine surface asperity is provided on the surface of the plate section 202. Thus, a printing process can be applied to the surface of the plate section 202.

This mat process can also improve the slidability against the sliding surface 106. By performing a mat process on the surface of the plate section 202, which faces the sliding surface 106, a shutter member having improved slidability can be obtained.

Furthermore, in order to fix the cartridge on a tray of the recording/reproduction device, the cartridge may be pressed so as to cause distortion in the cartridge. As a result, there is possibility that scratches are generated on the sliding surface 106. Performing an embossed process on a surface of the plate section 202, which faces the sliding surface 106, is effective to restrict such scratches to be generated on the sliding surface 106.

However, when the shutter member 200 is integrally molded, the fine asperity on the plate section 202 may causes the following problems. Specifically, when the slide core disclosed in Reference 1 is released, the fine asperity may restrict the mold to be released, for example. When the mold is forcefully released, breakage between the sliding section 201 and the plate section 202 may occur. When the slide core is pulled out, the fine asperity may be collapsed. For the reasons described above, when the shutter member 200 is integrally molded, it is impossible to perform the embossed process on the surface of the plate section 202, which faces the sliding surface 106. It is also impossible to improve the slidability between the shutter member 200 and the case member 100. It is further impossible to restrict scratches to be generated on the sliding surface 106.

References 2 and 3 are known as they provide means for solving the various problems which are inherent to the shutter member which is integrally molded.

References 2 and 3 relate to the shutter member precursor in which a plate section is integrally molded on only one side of the sliding section. The shutter member can be obtained by assembling the shutter member precursor onto the case member and by fusing the shutter member precursor. In this method, it is essential to apply heat and pressure to the shutter member precursor, when the shutter member precursor is fused.

The application of pressure during heating may cause distortion in the sliding section and the plate section. This distortion may change the angle between the sliding section and the plate section to a sharp angle or a blunt angle. Thus, a problem similar to the problem of Reference 1 described above may occur.

As described above, it is possible to correct the shape of the shutter member when the shutter member is integrally molded. However, in References 2 and 3, the shutter member precursor is assembled onto the case member, and then the shutter member precursor is fused. Further, in References 2 and 3, a guide groove which engages with a protrusion section on the shutter member is provided on the surface of the case member, on which the shutter member slides. It is impossible to make any correction after the shutter member precursor is fused.

This distortion may change the angle between the sliding section and the plate section as described above. In addition, in Reference 2, this distortion may reduce the parallelism between the plate section integrally molded with the sliding section and the plate section secured by welding, along the sliding direction of the sliding section. In addition, in Reference 3, this distortion may reduce the parallelism between the sliding directions of the sliding sections. As a result, it is difficult for the shutter member to properly slide along the sliding sidewall of the case member. When the parallelism is significantly shifted, the engagement of the shutter member with the shutter opener may become insufficient, or the engagement of the opposite edge with the shutter block section becomes insufficient, for example.

Reference 4 disclose a cartridge capable of taking the stored information medium from the cartridge, by rotating the movable lid fitted onto the lower case. The rotatable plate section of the shutter member is also rotated in relation to the rotation of the movable lid.

The sliding section and the plate section are fixed by engaging the L-shaped engaging depression section on the sliding section at the side of the lower case with the L-shaped engaging projection section on the plate section, with the application of force in the sliding direction of the sliding section. The sliding section and the non-rotatable plate section are fixed by engaging the L-shaped engaging depression section of the sliding section with the L-shaped engaging projection section on the non-rotatable plate section, with the application of force in the sliding direction of the sliding section. The processing accuracy of the L-shaped depression section and the L-shaped protrusion section is required.

For example, when the size of the L-shaped depression section is smaller than the size of the L-shaped protrusion section, or the size of the L-shaped protrusion section is larger than the size of the L-shaped depression section, the greater force is must be applied in order to engage the sliding section with the plate section (or the non-rotatable plate section). However, the direction to which the force is applied is the sliding direction of the sliding section, and therefore, the sliding section slides when the force is applied. For this reason, it is difficult to apply the force, and it is possible to break the portion in which the L-shaped depression section and the L-shaped protrusion section are engaged with each other.

On the other hand, when the size of the L-shaped depression section is larger than the size of the L-shaped protrusion section, or the size of the L-shaped protrusion section is smaller than the size of the L-shaped depression section, the shutter member may easily disassembled at the engagement portion. This may lead to the lack of reliability of cartridge in the recording/reproduction device, for example.

Furthermore, the non-rotatable plate section and the rotatable plate section are engaged by rotatabley engaging hemispherical depression section and hemispherical protrusion section. For this reason, the engagement strength of the engagement portion may be reduced by the external force applied to the shutter member when the sliding motion of the shutter member its repeated, and the shutter member may easily disassembled at the engagement portion.

The present invention has been made in view of the problems described above. One purpose of the present invention is to provide a cartridge and a shutter member used in the cartridge which has high parallelism between the plate member and the sliding surface of the case member and which does not provide any resistance in opening/closing the window section on the sliding surface.

DISCLOSURE OF THE INVENTION

The shutter member of the present invention is a shutter member used in a cartridge having a case member. The case member includes a medium storage section for storing an information medium having an information layer and a window section configured to allow at least a head to be inserted. The head is used to perform a recording operation or a reproduction operation for the information layer. The shutter member includes: a base member operable to slide along a sidewall of the case member; and a plate member engaged with the base member, which is operable to open/close the window section of the case member in accordance with a sliding motion of the base member, wherein the base member and the plate member are engaged with each other such that the plate member can be removed from the base member.

The cartridge of the present invention includes a case member and a shutter member. The case member includes: a medium storage section for storing an information medium having an information layer; and a window section configured to allow at least a head to be inserted. The head is used to perform a recording operation or a reproduction operation for the information layer. The shutter member includes: a base member operable to slide along a sidewall of the case member; and a plate member engaged with the base member, which is operable to open/close the window section of the case member in accordance with a sliding motion of the base member, wherein the base member and the plate member are engaged with each other such that the plate member can be removed from the base member.

EFFECT OF THE INVENTION

The shutter member and the cartridge of the present invention has a structure described above. This provides an effect that there is no resistance against the sliding motion of the plate member in accordance with the sliding motion of the base member, and the shutter member can be easily incorporated into the case member.

Figure 1:
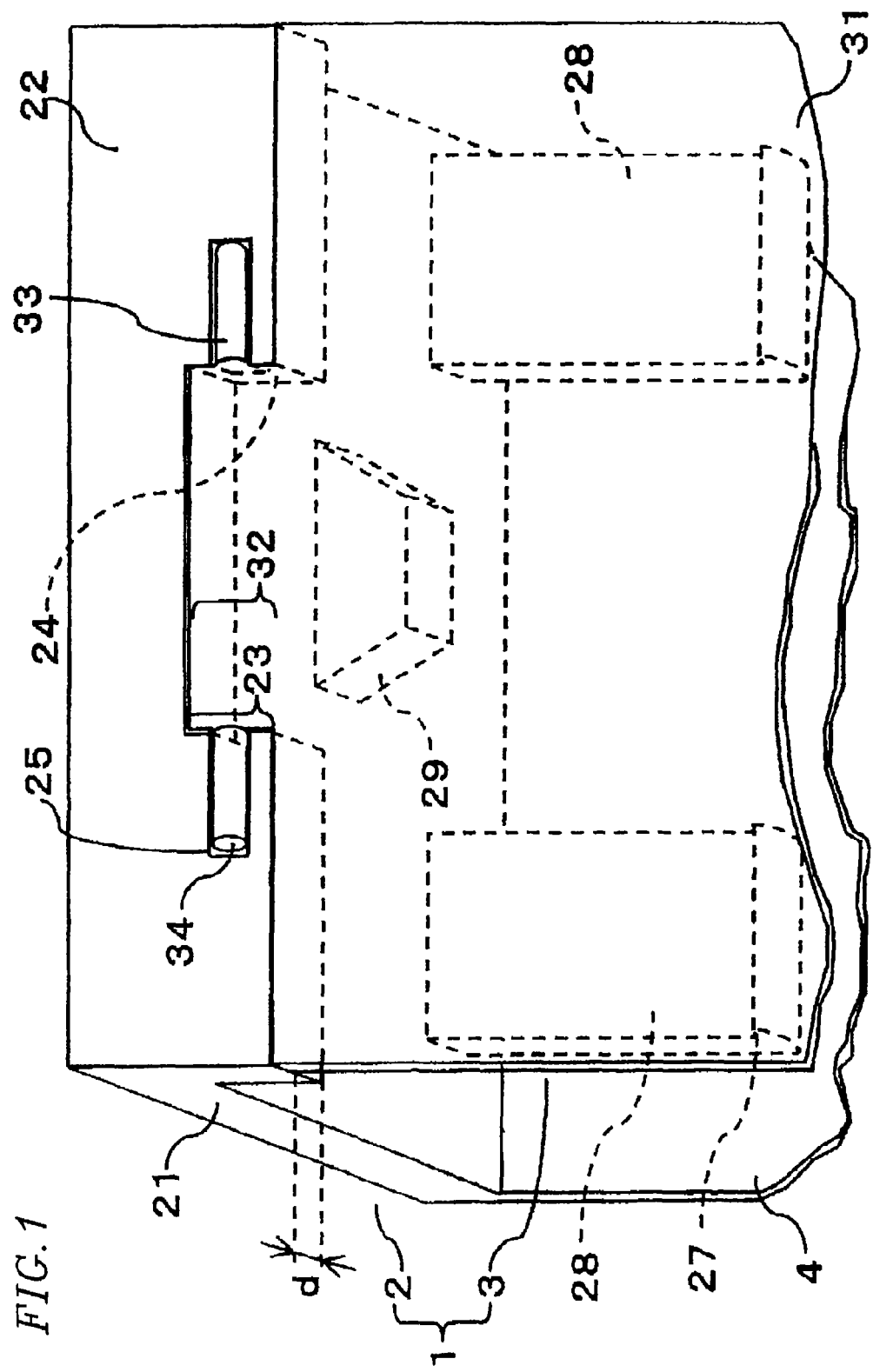
FIG. 1 is an oblique perspective view of a shutter member in an embodiment of the present invention.

1 Shutter member
 2 Base member
 3 Plate member
 4 Integrated plate section
 5 Sliding/engaging side plate section
 21 Sliding flat plate section
 22 Sliding side plate section
 23 Cutout section
 24 Wall
 25 Bearing section
 26 Bearing cross-section
 31 Window coverage section
 32 Engaging protrusion section
 33 Rotary shaft
 34 Rotary shaft cross-section

BEST MODE FOR CARRYING OUT THE INVENTION

The shutter member of the present invention is used in a cartridge having a case member. The case member includes a medium storage section for storing an information medium having an information layer and a window section configured to allow at least a head to be inserted. The head being used to perform a recording operation or a reproduction operation for the information layer. The shutter member includes: a base member operable to slide along a sidewall of the case member; and a plate member engaged with the base member, which is operable to open/close the window section of the case member in accordance with a sliding motion of the base member, wherein the base member and the plate member are engaged with each other such that the plate member can be removed from the base member.

According to the shutter member having the structure described above, it is possible to provide an effect that there is no resistance against the sliding motion of the plate member in accordance with the sliding motion of the base member and the shutter member can be easily incorporated into the case member.

In the shutter member of the present invention, the base member may include bearing sections, the plate member may include rotary shafts, and the base member and the plate member may be engaged with each other by inserting the rotary shafts of the plate member into the bearing sections of the base member such that the plate member can be rotated with respect to the base member.

The cartridge of the present invention includes a case member and a shutter member. The case member includes: a medium storage section for storing an information medium having an information layer; and a window section configured to allow at least a head to be inserted. The head being used to perform a recording operation or a reproduction operation for the information layer. The shutter member includes: a base member operable to slide along a sidewall of the case member; and a plate member engaged with the base member, which is operable to open/close the window section of the case member in accordance with a sliding motion of the base member, wherein the base member and the plate member are engaged with each other such that the plate member can be removed from the base member.

According to the cartridge having the structure described above, it is possible to provide an effect that there is no resistance against the sliding motion of the plate member in accordance with the sliding motion of the base member and the shutter member can be easily incorporated into the case member.

In the cartridge of the present invention, the base member may include bearing sections, the plate member may include rotary shafts, and the base member and the plate member may be engaged with each other by inserting the rotary shafts of the plate member into the bearing sections of the base member such that the plate member can be rotated with respect to the base member.

In the cartridge of the present invention, the base member may include: a sliding flat plate section having a predetermined length along a sliding direction in which the base member slides along the sidewall of the case member and a predetermined width along a direction perpendicular to the sliding direction; and a sliding side plate section coupled to a side edge along the width direction of the sliding flat plate section, which has a cutout section at substantially the center along the length direction of the sliding flat plate section, the plate member may include: a window coverage section for covering the window section; and an engaging protrusion section which protrudes from the window coverage section, wherein the rotary shafts may be provided to protrude from a pair of edge walls which are parallel to the sliding direction of the engaging protrusion section, and the bearing sections are provided in the cutout section of the sliding side plate section.

According to the cartridge having the structure described above, the plate member can be molded individually. This makes it possible to form the plate member having an extremely high planarity as the window coverage section of the shutter member.

Furthermore, the sliding member and the plate member are engaged with each other by inserting the rotary shafts of the engaging protrusion section of the plate member into the bearing sections of the cutout section of the sliding side plate section such that the engaging protrusion section of the plate member can be rotated with respect to the cutout section of the sliding side plate section. Accordingly, it is possible to guarantee that the sliding surface of the case member having the window section on which the window coverage section slides should be parallel to the plate member.

Furthermore, it is possible to perfectly provide a structure which can completely prevent the window coverage section to be in contact with the side edges of the window section, when the window section is opened/closed by the window coverage section in accordance with the sliding motion of the sliding section. It is possible to eliminate the correction process for the shutter member which is integrally molded. It is possible to improve the yield and the operation efficiency of the shutter member. It is possible to reduce the cost of the cartridge.

In the cartridge of the present invention, a pair of sliding side plate sections may be coupled to the side edges in the width direction of the sliding flat plate section, and each of the pair of sliding side plate sections may include the cutout section.

According to the cartridge having the structure described above, a clamping section called a damper can be applied to the record/reproduction device. The clamping section clamps the information medium to the rotation driving means for driving the rotation of the information medium within the record/reproduction device. In addition, by providing a plate member for each bearing of a pair of cutout sections on the sliding flat plate section, it is possible to completely solve the problem that the window coverage section is in contact with the side edges of the window section, when the open/close operation of the plate member is performed in accordance with the sliding motion of the base member.

In the cartridge of the present invention, the cartridge may further include a shutter opener engaging section which engages with a shutter opener during the open operation of the shutter member, wherein the cutout section of the sliding side plate section may extend to the shutter opener engaging section.

According to the cartridge having the structure described above, it is possible to increase the certainty for the open/close operation of the shutter member by the shutter opener. In addition, it is possible to increase the tolerance in forming the cutout sections and the engaging protrusion sections of the plate member. It is possible to improve mechanical strength and reliability of the base member and the plate member.

In the cartridge of the present invention, the rotary shaft may have a shape including a pair of cut surfaces which is obtained by cutting the rotary shaft along the plane parallel to the window coverage section.

According to the cartridge having the structure described above, by inserting the plate member into the base member in the direction substantially perpendicular to the information medium stored in the medium storage section, it is possible to easily engage the plate member with the base member while the cut surfaces of the rotary shaft face the bearing guide section which guides the rotary shaft from the surface of the sliding side plate section to the bearing section.

By rotating the plate member by 90 degrees after the insertion, the cut surface becomes parallel to the surface of the case member on which the window coverage section slides. It is also possible to prevent the rotary shaft to be pulled out from the bearing section.

Thus, the assembly of the shutter member is extremely easy. After the shutter member assembled onto the case member, it is possible to restrict the plate member to be dropped out from the base member. It is also possible to guarantee the sliding stability of the shutter member due to high parallelism between the surface formed by the window section and the window coverage section.

In the cartridge of the present invention, the rotary shaft may be provided to protrude from a rib of the engaging protrusion section.

According to the cartridge having the structure described above, it is possible to increase degree of freedom for the rotation of the plate member around the rotary shaft by the protruding amount of the rib which protrudes from the flat surface of the engaging protrusion section. It is also possible to easily insert the rotary shaft into the bearing section. It is also possible to improve the mechanical strength of the rotary shaft. Thus, a preferred shutter member can be configured.

In the cartridge of the present invention, the window coverage section includes a sliding surface on which the case member slides, and a mat finish having fine depressions and protrusions is provided on the sliding surface.

According to the cartridge having the structure described above, it is possible to reduce the frictional force between the window coverage section and the surface of the case member on which the window coverage section slides. It is also provide a cartridge having a shutter member having an improved sliding property.

In the cartridge of the present invention, near an edge of the window coverage section perpendicular to the sliding direction, within a predetermined width of the window coverage section, either a depression away from the sliding surface of the case member on which the window coverage section slides or a taper portion where the thickness is gradually smaller in a direction towards the edges may be provided.

According to the cartridge having the structure described above, it is possible to prevent the edge of the window coverage section to be in contact with the edges of the window section. It is also possible to perfectly restrain the possibility that the window coverage section is to be in contact with the edges of the window section.

For example, in order to fix the cartridge on a tray of the recording/reproduction device, an external force may be applied to the cartridge. This may cause distortion in the cartridge. However, even if such distortion is caused in the cartridge, the edge of the window coverage section cannot be in contact with the edges of the window section. Accordingly, the sliding property of the shutter member against the case member can be guaranteed in any case.

In the cartridge of the present invention, the material for the base member may have at least one of a higher sliding property and a higher glass transition point, compared to the material for the plate member.

According to the cartridge having the structure described above, materials which are relatively expensive, have good molding properties can be selected for the base member having a complicated shape. Further, the material for the base member can be selected in view of the sliding properties of the sliding section against the sidewall of the case member on which the sliding section slides. Materials which are relatively inexpensive can be selected for the plate member in view of only molding properties.

Thus, it is possible to increase the degree of freedom in selecting materials suitable for each of the sliding section and the window coverage section of the shutter member. It is also possible to reduce the cost of the shutter member.

In general, the surface of the molded products comprised of the material having superior sliding properties, such as polyacetal resin and fluorine-containing resin, is not suitable for printing. As the material for the plate member, it is possible to select materials to which a printing preparation process is easily performed, such as acrylonitrile-styrene resin and acrylonitrile-butadiene-styrene resin.

Hereinafter, the cartridge of the present invention will be described with reference to the drawings.

FIG. 1 is an oblique perspective view of an embodiment of a shutter member 1 which can be applied to the cartridge of the present invention.

The shutter member 1 includes a base member 2 and a plate member 3. The base member 2 and the plate member 3 are engaged with each other such that plate member 3 can be removed from the base member 2. The base member 2 and the plate member 3 are engaged with each other by, for example, inserting the rotary shafts 33 of the plate member 3 into the bearing sections 25 of the base member 2 such that the plate member 3 can be rotated with respect to the base member 2.

Figure 2:
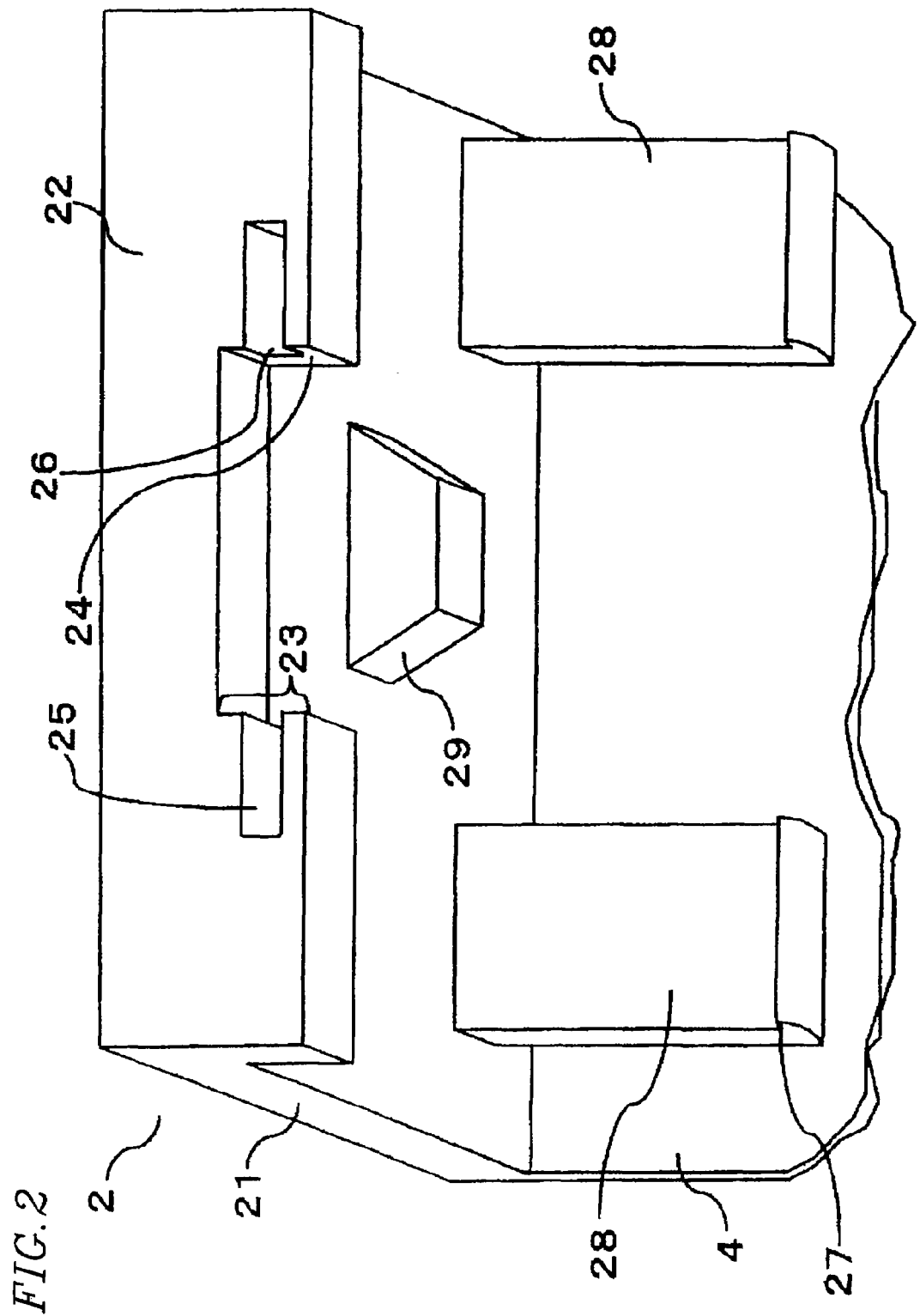
FIG. 2 is an oblique perspective view of the base member shown in FIG. 1.

As shown in FIGS. 1 and 2, the base member 2 includes a sliding flat plate section 21 and a sliding side plate section 22.

The sliding flat plate section 21 has an inner sliding surface which slides along a sidewall (hereafter, "sliding sidewall") of the case member 100 (not shown). The sliding flat plate section 21 has a predetermined length along the sliding direction and a width larger than the thickness of the sliding sidewall 109 (not shown).

The sliding side plate section 22 extends from the sliding flat plate section 21 by a predetermined height in a direction from the sliding sidewall 109 to the case member 100. The sliding side plate section 22 has a length which is substantially the same as the length of the sliding flat plate section 21 along the sliding direction. The sliding side plate section 22 has a cutout section 23 which is obtained by cutting a substantially central portion of the sliding side plate section 22 along the sliding direction. The cutout section 23 has a pair of walls 24 spaced apart from each other by a predetermined width. The bearing sections 25 are provided such that they are exposed to the sliding side plate section 22 and the pair of walls 24.

In this example, the base member 2 includes hook sections 28 and a guide protrusion section 29. Each of the hook sections 28 has a hook 27 which engages with a locking rib 110 in order to slide along the sliding sidewall 109. The guide protruding section 29 guides the groove formed on the sliding sidewall 109. However, it is possible that the base member 2 does not include the hook sections 28 and the guide protrusion section 29 as described above.

Figure 3:
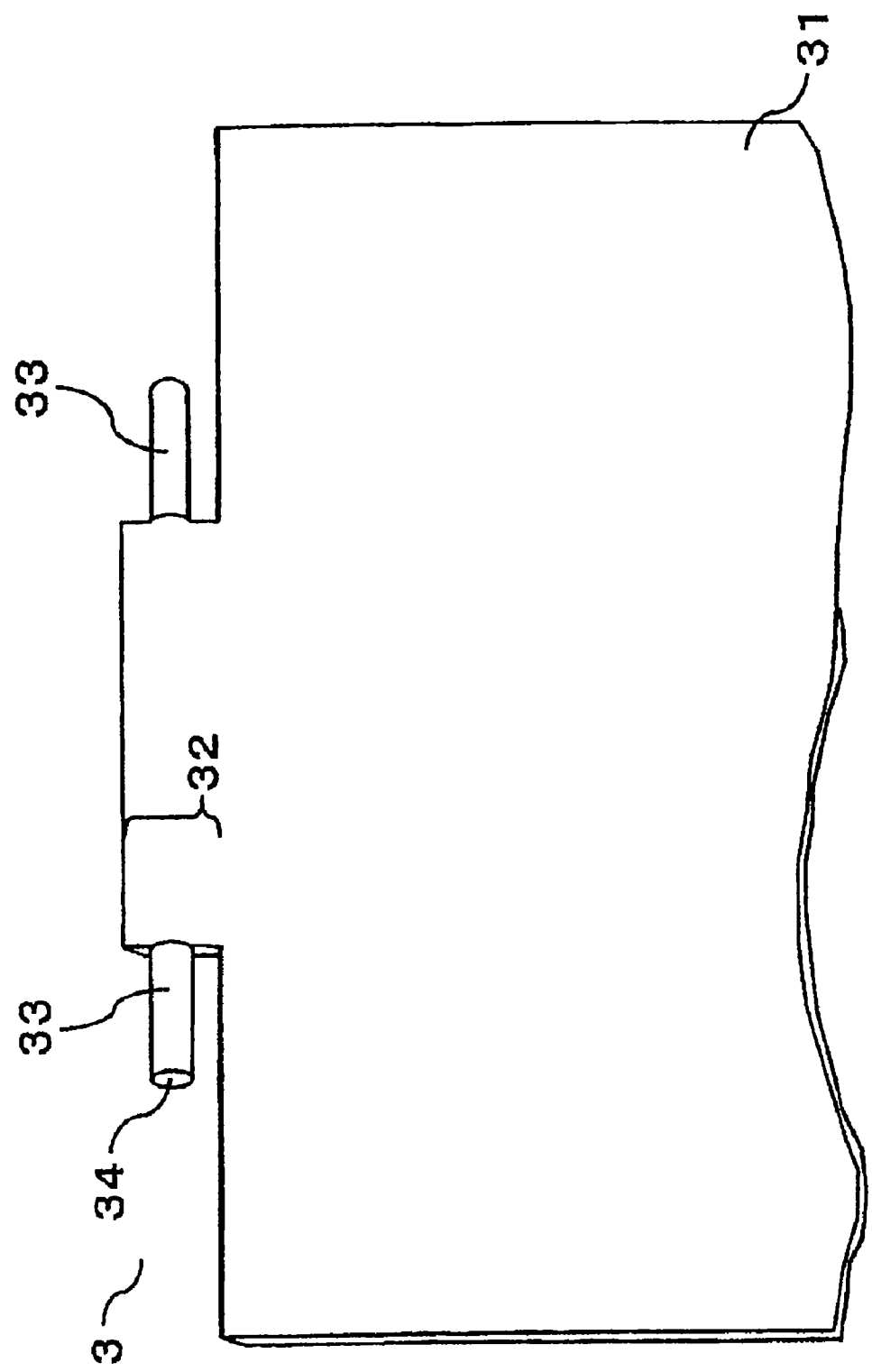
FIG. 3 is an oblique perspective view of the plate member shown in FIG. 1.

As shown in FIGS. 1 and 3, the plate member 3 includes a window coverage section 31 which covers the window section included in the case member (not shown) and an engaging protrusion section 32 which engages with the cutout section 23, which protrudes from substantially the center of the window coverage section 31 by a predetermined length. The rotary shaft 33 has a rotary shaft cross-section 34 such that the rotary shaft 33 is rotatably inserted into the bearing section 25. The integrated plate section 4 is a plate member connected to the base member 2 on the side opposite to the plate member 3.

As understood from FIG. 1, the width of the cutout section 23 is substantially the same as the width of the engaging protrusion section 32, and the length of the sliding flat plate section 21 is substantially the same as the width of the window coverage section 31 along the sliding direction. Additionally, the area of the rotary shaft cross-section 34 is smaller than the area of the wall 24, and a pair of bearing sections 25 and a pair of rotary shafts 33 has the same central axis.

In the shutter member 1 according to the present embodiment, the rotary shafts 33 of the plate member 3 and the bearing sections 25 of the base member 2 have a free-insertion relationship (in other words, the rotary shafts 33 of the plate member 3 are inserted into the bearing sections 25 of the base member 2 such that the plate member 3 can be rotated with respect to the base member 2).

Figure 11:
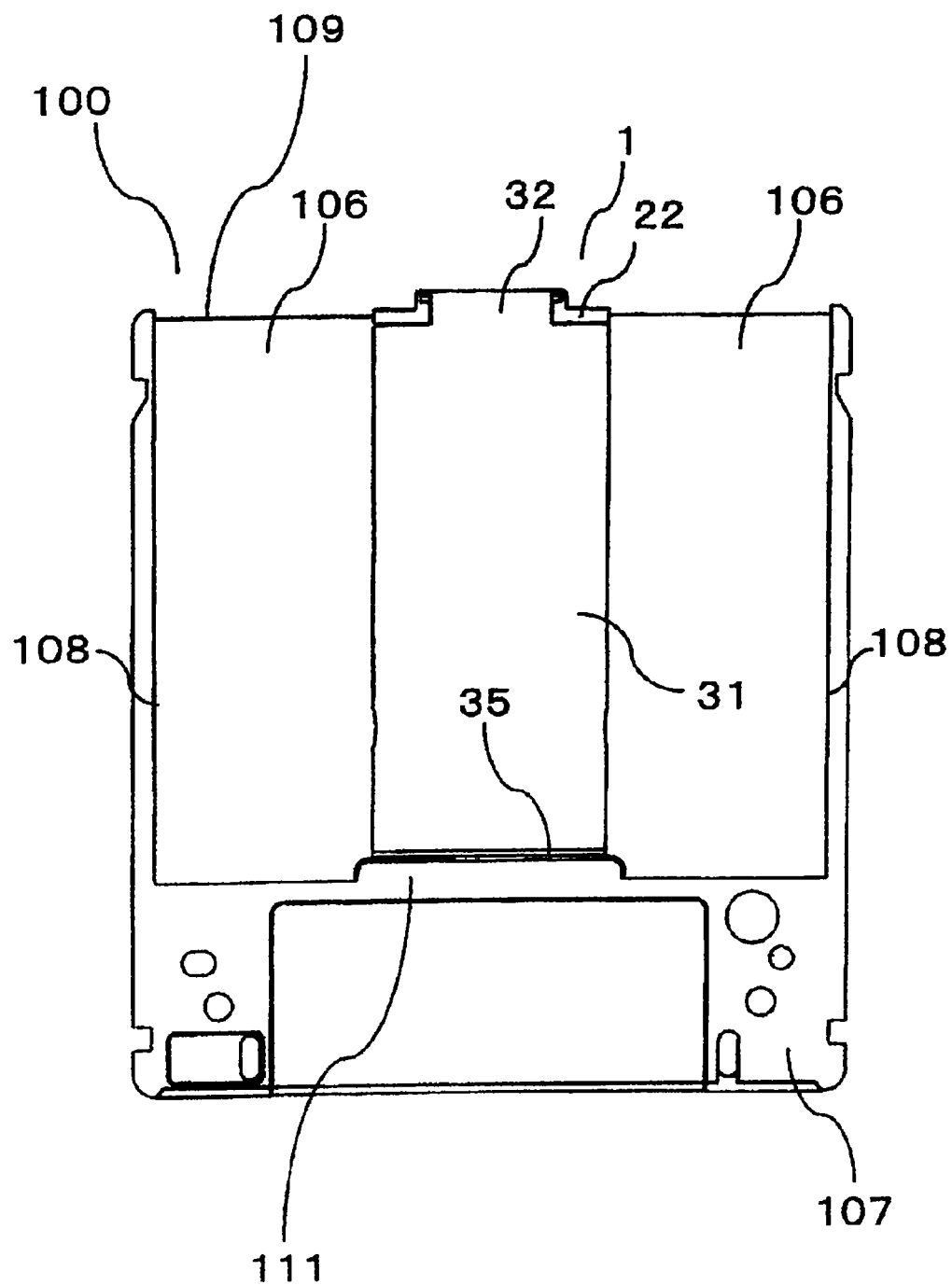
FIG. 11 is a plain view of a cartridge in which a shutter member is in a closed state in one embodiment of the present invention.

For example, when the sliding flat plate section 21 of the base member 2 is engaged with the sliding sidewall 109 of the case member 100 shown in FIG. 11 such that the sliding flat plate section 21 slides along the side wall 109, and the cartridge is placed vertically on the rear sidewall 112, which is the opposite side of the sliding sidewall 109, the distance between a surface of the window coverage section 31 facing the sliding surface 106 and a surface of the sliding side plate section 22 facing the sliding surface 106 is maintained to be the same distance d throughout the entire window coverage section 31.

Thus, it is possible to solve the problem on the sliding property of the integrally molded conventional shutter member, i.e. the window coverage section 31 may be contact with the sliding surface 106 and/or the edges of the window section 105, which is caused by the angles formed by the slider section and the plate section being too sharp or too blunt.

In the shutter member 1 according to the present embodiment, the base member 2 and the plate member 3 are formed independently, and the rotary shafts 33 of the engaging protrusion section 32 of the plate member 3 are rotatably inserted into the bearing sections 25. This makes it possible to provide a plate member 3 having an extremely high planarity. Furthermore, the plate member 3 having an extremely high planarity and the base member 2 are engaged with each other such that the rotary shafts 33 are rotatably inserted into the bearing sections 25. This makes it possible to provide a shutter member 1 having an extremely high sliding property.

Additionally, when the cartridge is placed vertically on the rear sidewall 112, the distance d between the window coverage section 31 and the sliding surface 106 is kept constant throughout the entire surface of the plate member 3. Therefore, the favorable sliding relationship described above can be maintained even if the distance d is close to 0. The window coverage section 31 can restrict the entry of foreign matter, such as dust, into the cartridge through the edges of the window section 105.

Thus, by engaging the opposite edge (not shown) of the engaging protrusion section 32 of the plate member 3 with the shutter block section 111, it is possible to realize a cartridge having a superior sliding property as well, as a superior dust-proof property.

The rotary shafts 33 of the plate member 3 are inserted into the bearing sections 25 of the base member 2 from a direction perpendicular to the sliding direction through the opening of the sliding side plate section 22. This makes it possible to solve a problem as seen in Reference 4 that it is difficult to apply forces along the inserting direction due to the direction in which the base member 2 slides along the sliding sidewall 109. In addition, the machining accuracy can be reduced since the rotary shafts 33 are rotatably inserted into the bearing sections 25.

Furthermore, the plate member 3 and the base member 2 are engaged by a rigid engagement of the rotary shafts 33 and the bearings 25 in both the sliding direction and a direction perpendicular to the sliding direction. This makes it possible to reinforce the resistance against the sliding motion, unlike the turnable engagement of the hemispherical depression and the hemispherical projection described in Reference 4.

In the embodiment shown in FIGS. 1 and 2, the base member 2 and the integrated plate section 4 are molded as a single piece. However, the base member 2 can have a structure shown in FIG. 4, when the information medium 101 has a magnetic hub at the center hole 113, for example, and is chucked from one side by means of a magnetic chucking and the like.

Figure 4:
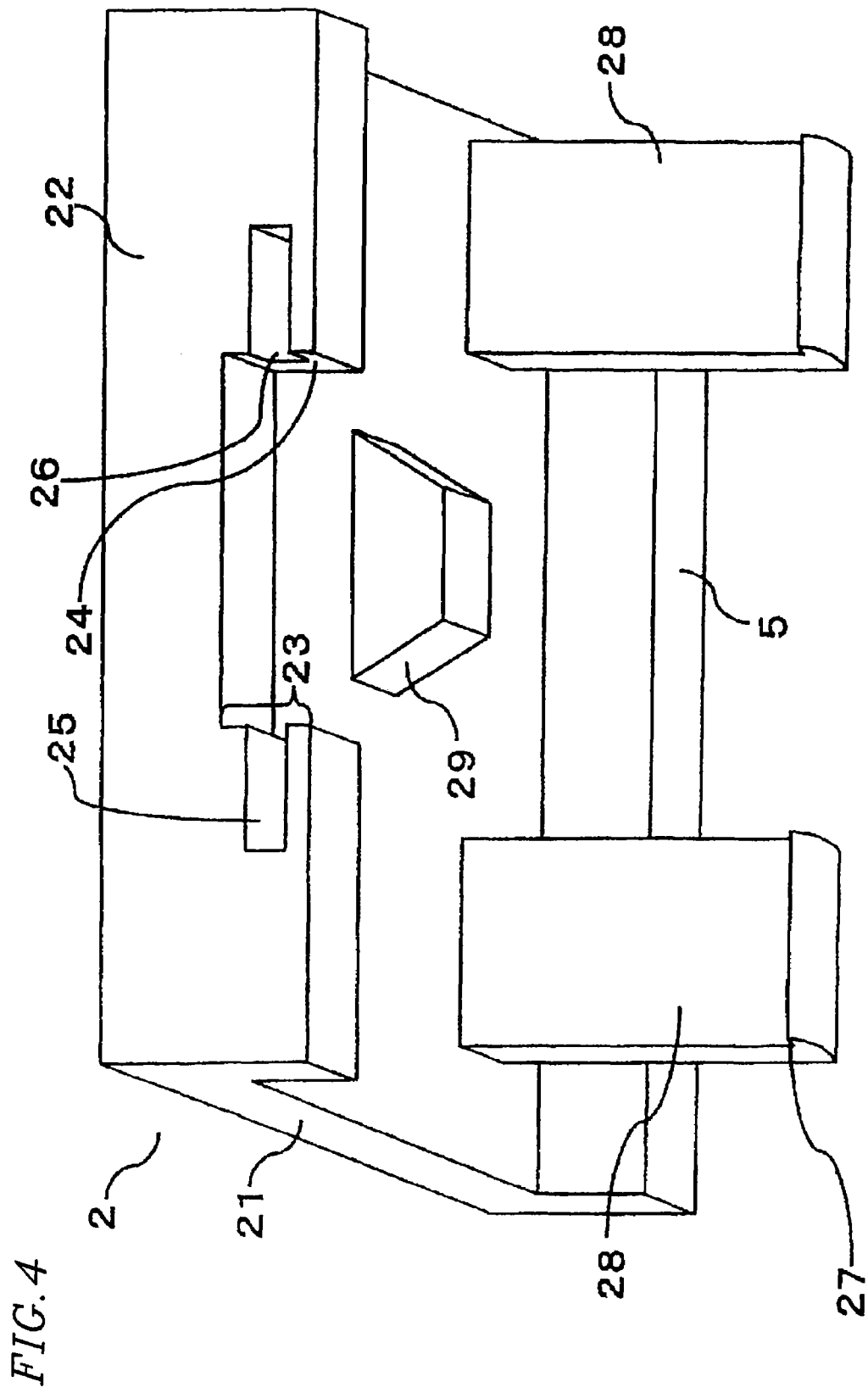
FIG. 4 is an oblique perspective view of the base member in another embodiment of the present invention.

FIG. 4 shows another embodiment of the base member 2 which can be applied to the cartridge according to the present invention.

The base member 2 shown in FIG. 4 is identical to the base member 2 shown in FIGS. 1 and 2, except that the base member 2 has a sliding/engaging side plate section 5 instead of the integrated plate section 4. According to the base member 2 described in FIGS. 1 and 2, it is possible to achieve a structure providing superior sliding properties of the plate member 3 on the sliding surface 106. However, there is some possibility that the angle formed by the integrated plate section 4 and the sliding flat plate section 21 is to be sharp or blunt, thereby possibly degrading the sliding properties along the sliding sidewall 109. On the other hand, when the structure of the base member 2 shown in FIG. 4 is employed, the perfect sliding properties may be guaranteed.

Figure 5:
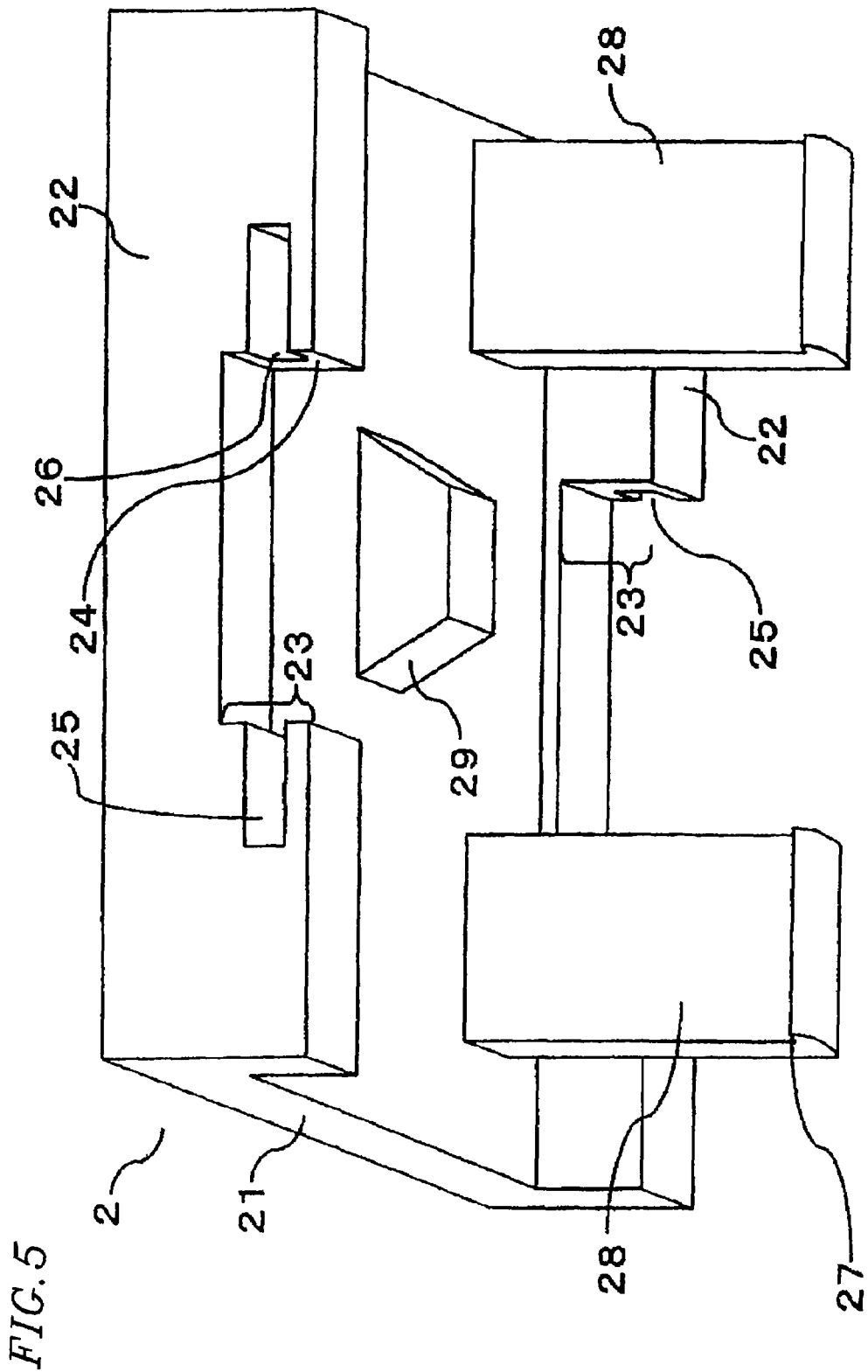
FIG. 5 is an oblique perspective view of the base member in another embodiment of the present invention.

FIG. 5 shows another embodiment of the base member 2 which can be applied to the cartridge according to the present invention.

The base member 2 shown in FIG. 5 includes another sliding side plate section 22 instead of the sliding/engaging side plate section 5 shown in FIG. 4, and the plate members 3 are rotatably inserted into the bearing sections 25 in the both cutout sections 23. This structure is effective when a medium rotation means, such as a turn table, is mounted at the center hole 113 from one side of the cartridge, and chucking the information medium 101, using a damper and the like, on the other surface of the center hole 113 engaging to the medium rotation means.

According to the present embodiment, it is possible to provide a cartridge which has a case member 100 including a window section 105 on the sliding surface 106 opposite to the sliding surface 106 via the information storage section 102, and it is also possible to provide a cartridge which has superior sliding properties of plate member 3 on the sliding surface 106 and which can be applied to an information medium 101 having information layers on both sides, for example.

As described in the embodiment above, the planarity of the plate member 3 of the present invention is extremely high with respect to the sliding surface 106. Accordingly, it is very unlikely that the window coverage section 31 and the sliding surface 106 come in contact with each other, for example.

However, in order to fix the cartridge of the present invention on a tray of the recording/reproduction device, the cartridge may be pressed so as to cause distortion in the cartridge. Accordingly, when the shutter member 1 is opened/closed on the tray, there is a possibility that the sliding surface 106 is to be scratched due to the contact between the sliding surface 106 and the window coverage section 31, and/or the contact between the sliding surface 106 and the edges of the window coverage section 31 in the sliding direction.

Since the plate member 3 of the present invention is molded as an individual piece, it is possible to provide embossed finish onto both surfaces of the plate member 3. It is also possible to provide the plate member 3 which has a depression having a predetermined width on the edges of the window coverage section 31 in the sliding direction, which faces the sliding surface 106. It is further possible to provide the plate member 3 having a taper portion where the thickness is gradually smaller in a direction towards the edges. Thus, it is possible to provide a cartridge has both follow-up of the distortion of the case member 100 and slidability.

As stated above, it is general to perform a printing preparation process for the window coverage section 31, so that users can visually identify additional information, such as the type and capacity of the information medium 101 stored in the cartridge, an identifier for the information layer for the information medium 101 having information layers on both sides, and the like. For example, embossed finish is applied to the window coverage section 31 by a printing preparation process.

The plate member 3 of the present invention is rotatably inserted into the base member 2 after the plate member 3 is molded individually. Accordingly, it is possible that the plate member 3 is removed from the cartridge, and a printing process is applied to the plate member 3 and then the plate member 3 is re-inserted into the base member 2. Thus, this is suitable for various usages of the users.

For example, it is possible that a preparation process suitable for inkjet printing is applied to the surface of the plate member 3, and a desired information is recorded on the information medium 101 stored in the cartridge, and the plate member 3 is removed from the cartridge, and the type and the like of the information recorded on the information medium 101 is written on the window coverage section 31 by the use of an inkjet printer, and then the plate member 3 is re-inserted into the base member 2.

Alternatively, it is possible that different colors are applied to the plate member 3 in accordance with different type of information recorded in the information medium 101.

Furthermore, when the information medium 101 is rewritable, it is possible that a rewritable, heat-sensitive recording layer, disclosed in Japanese Patent Publication 2598841 and Japanese Patent Publication 2993203, is formed on the plate member 3, and the base member 2 is removed from the plate member 3, and information corresponding to the recorded information is recorded by the use of a heat-sensitive recording method, and then the plate member 3 is re-inserted into the base member 2.

Various processes on the plate member 3 may be achieved by molding the base member 2 and the plate member 3 separately. In addition to performing a process on the plate member 3 (especially, the window coverage section 31) as described above, it is possible to provide materials suitable for the base member 2 and the plate member 3, respectively.

Specifically, since the base member 2 is required to slide along the sliding sidewall 109 and to have a complicated shape such as a hook section 28 having a hook 27 which engages with the locking rib 110 and a guide protrusion section 29, materials having good sliding properties, mold-release properties and/or high glass transition point, such as polyacetal resin, fluorine-containing resin, highly slidable acrylonitrile-butadiene-styrene resin and the like are suitable for the base member 2. Materials such as acrylonitrile-butadiene-styrene resin, acrylonitrile-styrene resin and the like are suitable for the plate member 3.

The materials can be selected appropriately in view of the required properties. The selection of the materials can provide the effect of reducing the cost of the materials for the shutter member 1 as a whole by using lower cost materials for the plate member 3 compared to the base member 2.

In all embodiments described above, the cartridge does not have a shutter opener engaging section for opening/closing the shutter member 1 on a surface of the base member 2, which is a surface opposite to the surface facing the case member 100 (hereinafter, "outer surface of the sliding flat plate section"). In this case, the cartridge have a flat outer surface of the sliding flat plate section.

For example, such a cartridge is a cartridge containing a magneto optical disc or a cartridge containing a magnetic disc for storing a computer program and the like. However, the cartridge of the present invention may have a shutter opener engaging section on the outer surface of the sliding flat plate section. By such a shutter opener engaging section, it is possible to improve the mechanical strength of the engaging protrusion section 32 and the bearing section 25.

Hereinafter, an embodiment in which the cartridge has a shutter opener engaging section on the outer surface of the sliding flat plate section will be described.

Figure 6:
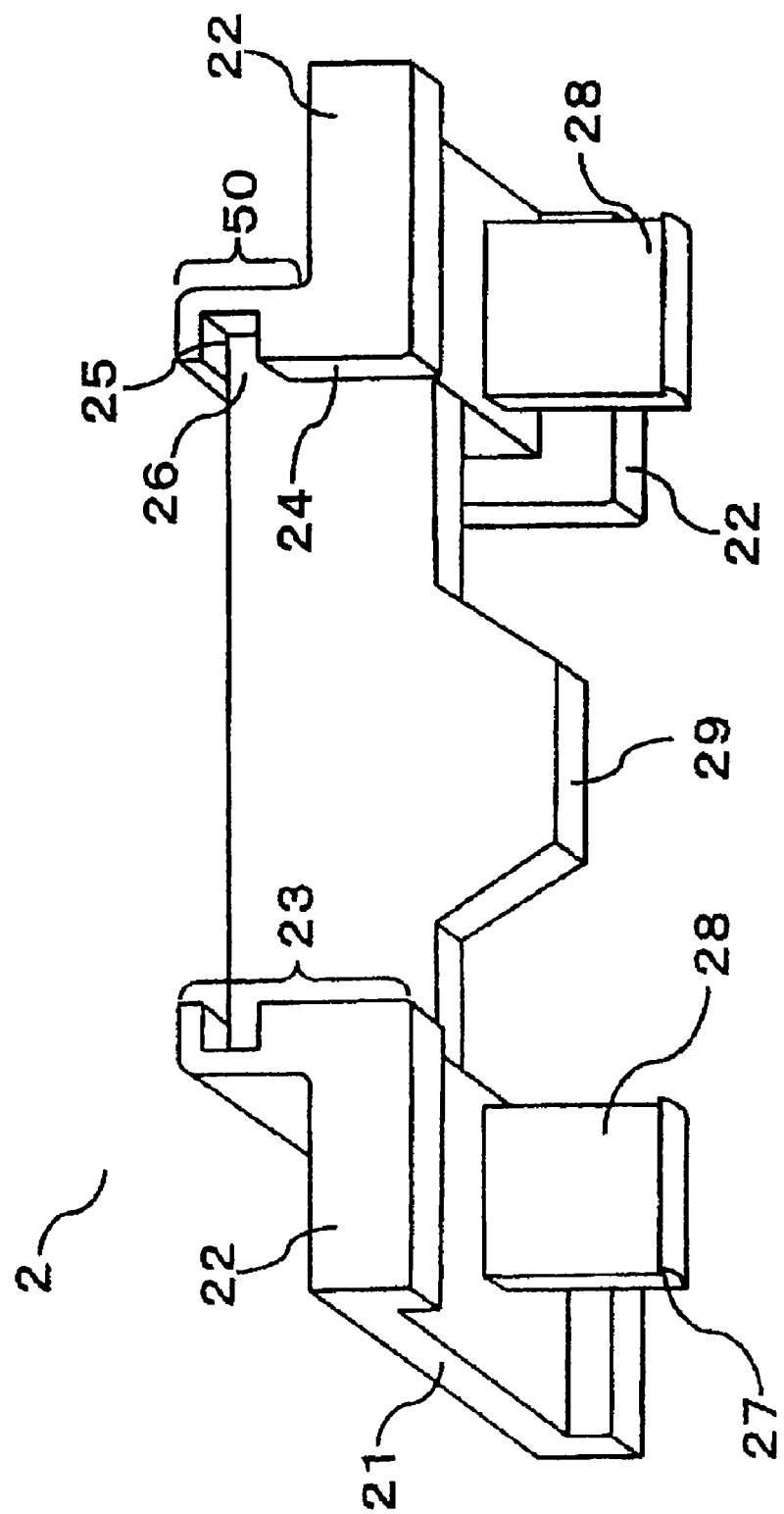
FIG. 6 is an oblique perspective view of the base member in another embodiment of the present invention.

FIG. 6 is an oblique perspective view of another embodiment of the base member 2 which can be applied to the cartridge according to the present invention.

Basically, the base member 2 shown in FIG. 6 has the same function as all the components of the embodiments described above, except that the base member 2 further includes a shutter opener engaging section 50. Since the cutout depth of the cutout section 23 in the sliding side plate section 22 is deeper than that of the embodiments described above, the extending length of the engaging protrusion section 32 of the plate member 3 which is inserted into and engages with the cutout section 23 may also be enlarged accordingly.

Thus, it is possible to improve the mechanical strength of the engaging protrusion section 32 and the degree of freedom of the location of the engaging protrusion section 32 having the rotary shafts 33. In addition, since the shutter opener engaging section 50 is provided on the outer surface of the sliding flat plate section, it is possible to simplify the structure of the shutter opener and to produce a recording/reproduction device capable of ensuring the opening/closing motion of the shutter member 1.

In the embodiments described above, the rotary shaft cross-section 34 is round shaped and the bearing cross-section 26 is a rectangular depression. However, it is not intended to exclude any other shapes.

For example, it is possible that the rotary shaft cross-section 34 is round shaped and the bearing cross-section 26 is polygonal, such as triangular and hexagonal, or oval. Alternatively, it is possible that the bearing cross-section 26 is a rectangular depression and the rotary shaft cross-section 34 may be polygonal, such as triangular and hexagonal. In summary, it is preferable that the rotary shaft cross-section 34 and the bearing cross-section 26 have a particular relationship in shape such that the rotary shaft 33 can be rotatably inserted into the bearing section 25 and it is difficult to remove the rotary shaft 33 from the bearing section 25. Thus, the shapes of the respective cross-sections can be freely selected.

Next, an embodiment regarding the shape of the rotary shaft cross-section 34 and the shape of the bearing cross-section 26 will be described below.

Figure 7:
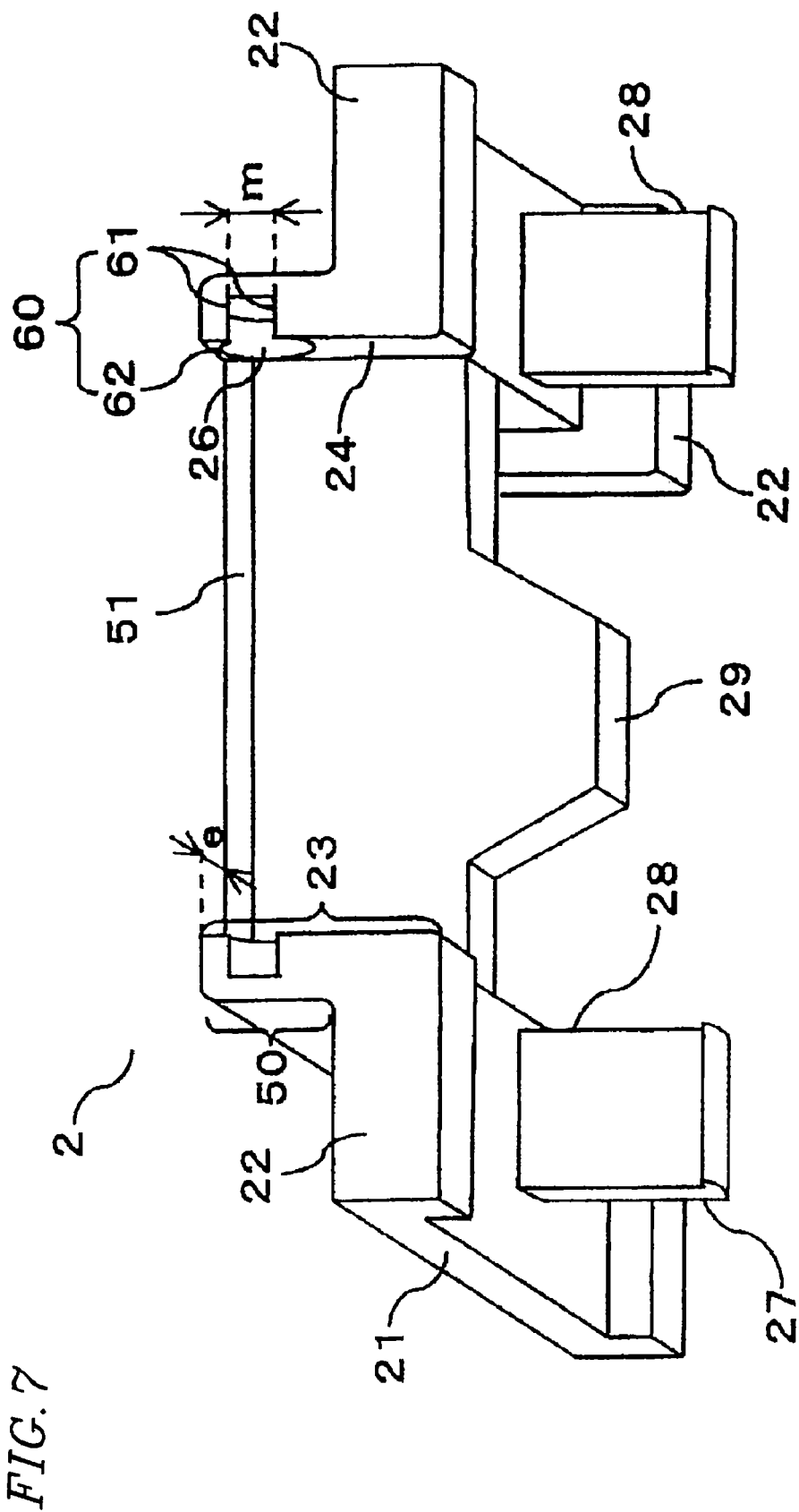
FIG. 7 is an oblique perspective view of the base member in another embodiment of the present invention.
Figure 8A:
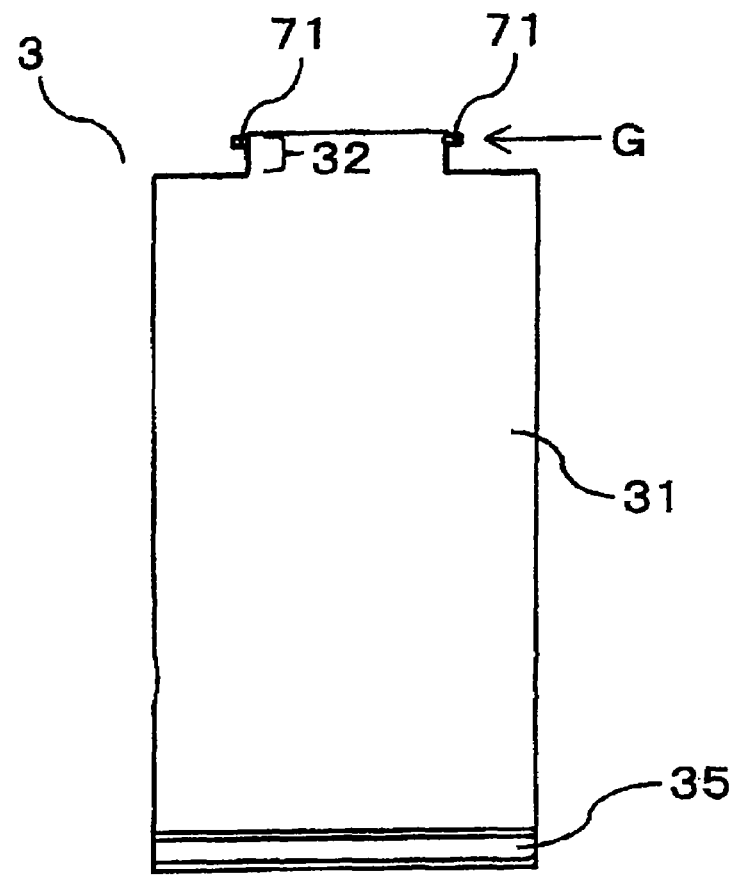
FIG. 8A is a plain view showing a structure of the plate member in another embodiment of the present invention.
Figure 8B:
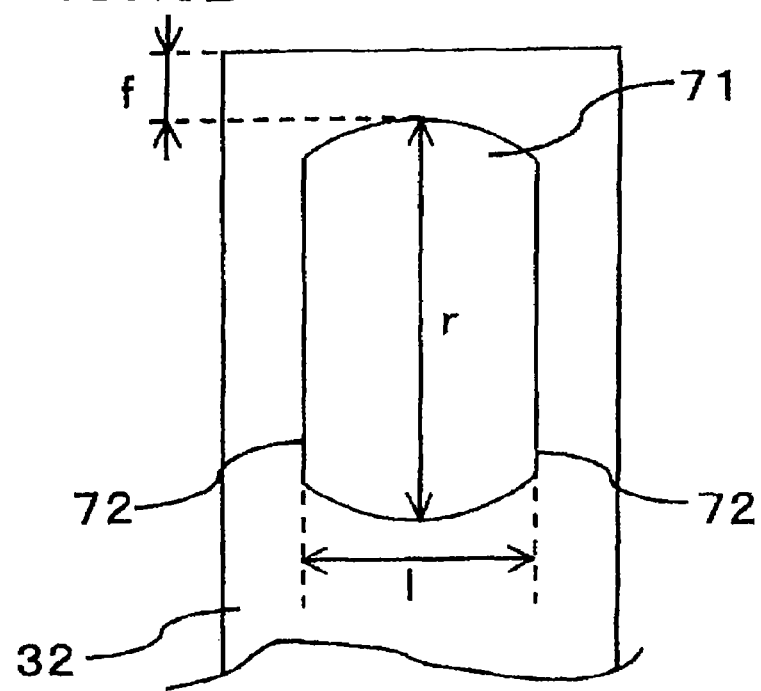
FIG. 8B is an enlarged view of the relevant part of the structure of the plate member in another embodiment of the present invention.

FIG. 7 is an oblique perspective view of the structure of the base member 2 in this embodiment. FIG. 8A is a plain view of the structure of the plate member 3. FIG. 8B is a enlarged view of the relevant part of the structure of the plate member 3.

The base member 2 shown in FIG. 7 has a shutter opener engaging section 50, and the depth of the cutout section 23 reaches the top of the shutter opener engaging section 50, similarly as shown in FIG. 6. Thus, the base member 2 shown in FIG. 7 can obtain a similar effect as that shown in FIG. 6.

The base member 2 shown in FIG. 7 is different from that shown in FIG. 6 in a top panel section 51 provided on the shutter opener engaging section 50 of the base member 2 and the structure of bearing sections 60 each having a bearing guide section 61 and a bearing insertion section 62. The top panel section 51 has a function of restricting the entry of foreign matter, such as dust, into the cartridge through the base member 2. The bearing guide section 61 has an opening on the surface of the sliding side plate 22, and is connected to the bearing insertion section 62. The opening has a substantially rectangular shape including a pair of sides facing one another with a distance m and parallel to the sliding direction. The bearing insertion section 62 has a round-shaped bearing cross-section 26.

As shown in FIG. 8A, the plate member 3 includes an engaging protrusion section 32, rotary shafts 71 located near the edges of the engaging protrusion section 32, and a block engaging section 35 located near the edge of the window coverage section 31 opposite to the rotary shafts 71.

The engaging protrusion section 32 protrudes from the substantially center of the window coverage section 31 in the width direction by a length corresponding to the cutout distance of the cutout section 23. The rotary shafts 71 engage with the bearing insertion section 62 such that the plate member 3 can be rotated around the rotary shafts 71. The block engaging section 35 engages with the shutter block section 111 of the case member 100.

The block engaging section 35 may be provided on the opposite edges of conventional shutters, or any of the plate members 3 in the embodiments described above. By reducing the thickness of block engaging section 35 into about the half the thickness of the window coverage section 31, for example, the block engaging section 35 may be inserted in a gap between the shutter block section 111 and the sliding surface 106.

FIG. 8B is an enlarged view seen in the direction of arrow G shown in FIG. 8A. FIG. 8B shows a detailed structure of the rotary shaft 71.

The cross-section of the rotary shaft 71 is generally a circle having a diameter r, but has a pair of cut sides 72 spaced by a distance l. The pair of cut sides 72 is equally spaced from the center line of the cross-section of the rotary shaft 71. The pair of cut sides 72 is obtained by cutting the rotary shaft 71 along a flat surface parallel to the surface of the window coverage section 31 which slides against the sliding surface 106.

The plate member 3, which is set to be parallel to the sliding flat plate section 21 and perpendicular to the sliding side plate section 23, is inserted into the bearing insertion sections 62 through the bearing guide sections 61 and then is rotated by 90 degrees around the rotary shafts 71 which are engaged with the bearing insertion sections 62. The distance e shown in FIG. 7 is provided to absorb the thickness of the engaging protrusion section 32 and/or the gap f between the rotary shaft 71 and the edge of the engaging protrusion section 32, which is opposite to the window coverage section 31, when the plate member 3 is rotated.

A gap having the distance e is required to the base member 2, since the distance from the center of the rotation of the rotary shafts 71 is extended by the thickness of the plate and the gap f. The gap f is not essentially required, and may be provided on the edge of the engaging protrusion section 32.

Furthermore, the diameter r of the rotary shaft 71, the distance l between the pair of cut sides 72 and the distance m in the bearing section 60 may be set to satisfy the relationship of r>m–l. When m is equal to l, it is preferable to satisfy the relationship of m>l, since the unnecessarily greater force is required to insert the plate member 3 into the base member 2 such that the plate member 3 can be rotated with respect to the base member 2.

The diameter r may be set to be equal to or less than the diameter of the bearing insertion section 62. However, in the case where both diameters are equal to each other, the unnecessarily greater force is required to rotate the plate member 3 after the plate member 3 is inserted into the bearing section 60. Therefore, it is preferable that the diameter r is less than the diameter of the bearing insertion section 62.

The arrangement of the engaging protrusion section 32 and the rotary shafts 71 shown in FIGS. 8A and 8B does not raise any functional problem. However, in order to improve the mechanical strength of the rotary shafts 72, the structure of the rotary shafts 71 extending from the side edges of ribs having the thickness of about 2 mm, wherein the ribs are provided in the engaging protrusion section 32, is preferable rather than the structure of the rotary shafts 71 extending from the side edges of the engaging protrusion section 32 having the thickness of about 1 mm.

Figure 9A:
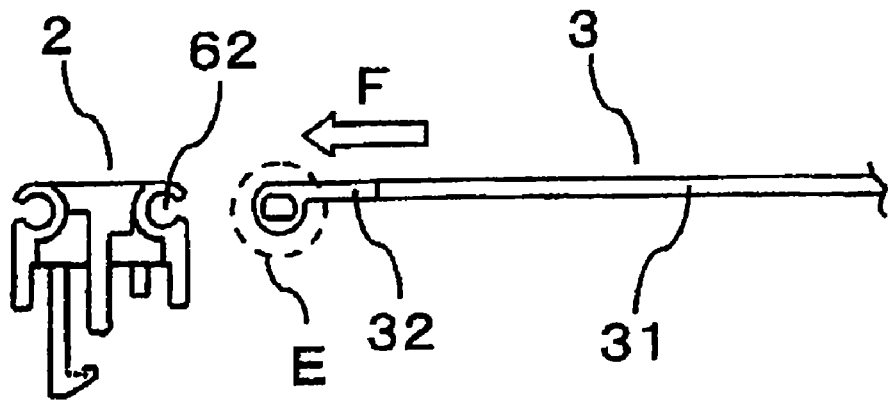
FIG. 9A is a drawing showing an insertion step in the assembly method for the shutter member of the present invention.
Figure 9B:
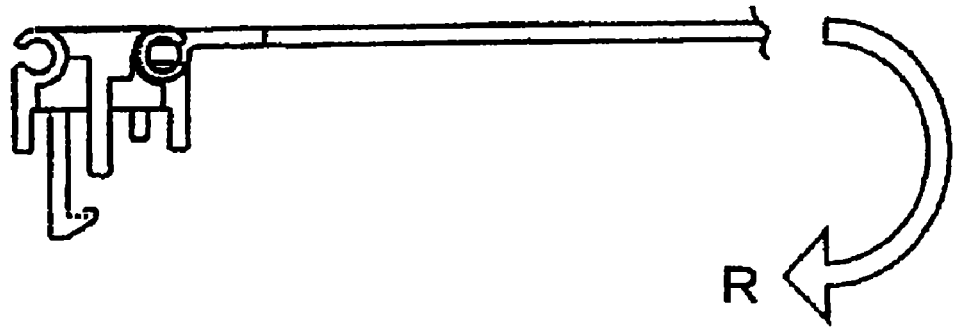
FIG. 9B is a drawing showing a rotation step in the assembly method for the shutter member of the present invention.
Figure 9C:
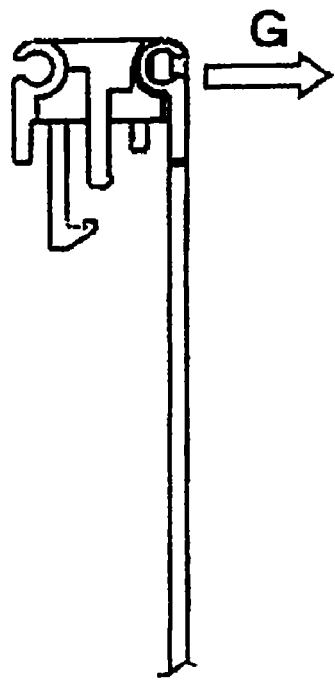
FIG. 9C is a drawing showing a state where the assembly of the shutter member has been completed in the assembly method for the shutter member of the present invention.
Figure 9D:
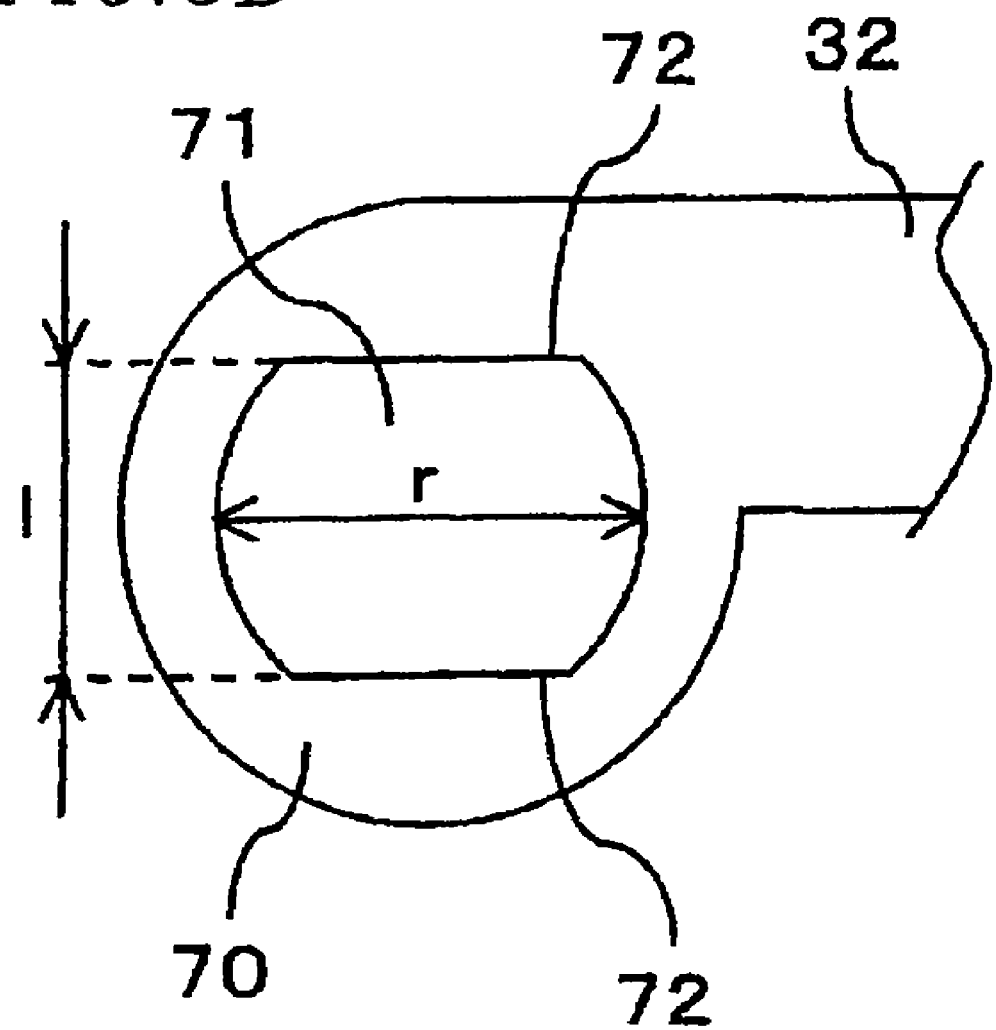
FIG. 9D is an enlarged view of the relevant part shown in FIG. 9A.

For example, when it is assumed that the thickness of the engaging protrusion section 32 shown in FIG. 9D is the same as the thickness of the engaging protrusion section shown in FIG. 8B (in the lateral direction of the sheet), it is understood that the diameter r of the rotary shaft 71 and the distance l between the pair of cut sides 72 shown in FIG. 9D are greater than those shown in FIG. 8B.

Next, with reference to FIGS. 9A to 9D, a method for assembling the shutter member 1 which can be applied to the cartridge of the present invention.

This assembly method is not limited to the embodiment shown in FIGS. 9A to 9D, and is commonly applied to all the shutter members 1 which can be applied to the cartridge of the present invention.

FIG. 9A shows a step of inserting the plate member 3 into the bearing insertion sections 62 of the base member 2. FIG. 9B shows a step of rotating the plate member 3 by 90 degrees after the insertion. FIG. 9C shows a state where the assembly of the shutter member 1 has been completed after the rotation. FIG. 9D shows an enlarged view of the portion E in FIG. 9A.

As shown in FIG. 9A, the plate member 3 is placed in a direction parallel to the sliding direction of the base member 2, which is perpendicular to the sliding side plate section 22, and then is inserted into the bearing insertion sections 62 through the bearing guide sections 61 in the direction of the arrow F. At this time, the pair of cut sides 72 shown in FIG. 9D is substantially parallel to the opening of the bearing guide sections 61. Accordingly, the plate member can be easily inserted due to the dimensional relationship between m and l described above.

The assembly of the shutter member 1 is completed as shown in FIG. 9C by inserting the rotary shafts 71 into the bearing insertion sections 62 (see FIG. 9A) and by rotating the plate member 3 by about 90 degrees with respect to the base member 2 in the direction of the arrow R (see FIG. 9B).

In the state shown in FIG. 9C, even if any force is applied to the assembly between bearing insertion sections 62 and the rotary shaft 71 in the direction of the arrow G, it is not possible to pull the plate member 3 away from the base member 2 since the relationship of r and m is satisfied as described above.

In the state shown in FIG. 9C, the plate member 3 and the sliding side plate section 22 maintains a parallel relationship, and therefore the plate member 3 is also parallel to the sliding surface 106. This may accomplish the structure wherein the window coverage section 31 freely slides on the sliding surface 106 in accordance with the sliding motion of the base member 2.

Figure 10:
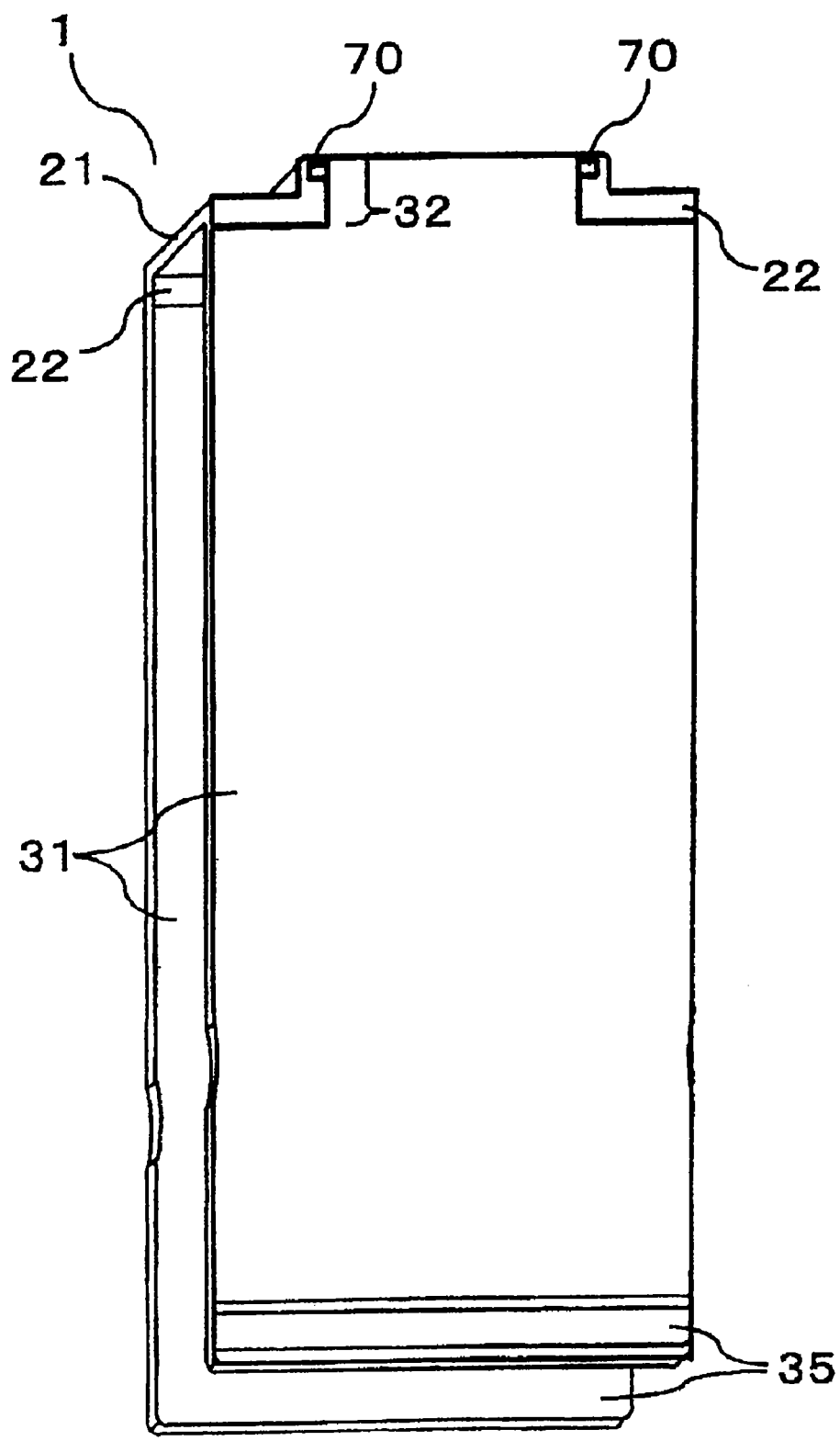
FIG. 10 is an oblique perspective view of a shutter member in another embodiment of the present invention.

The sliding side plate section 22 of the base member 2 in FIG. 9C includes the bearing sections 60 on both sides. The shutter member 1 shown in FIG. 10 can be obtained by repeating the steps shown in FIGS. 9A to 9C.

In assembling the shutter member 1 of the cartridge, in general, the base member 2 is engaged with the case member 100 such that the base member 2 slides on the case member 100. Then, the plate member 3 is inserted and rotated in the steps described with reference to FIGS. 9A to 9D so as to complete the assembly of the shutter member 1.

After the shutter member 1 has been assembled onto the case member 100, the window coverage section 31 is bowed out to fit Into the shutter block section 111 on the case member 100 so as to complete the assembly of the cartridge shown in FIG. 11.

Figure 12:
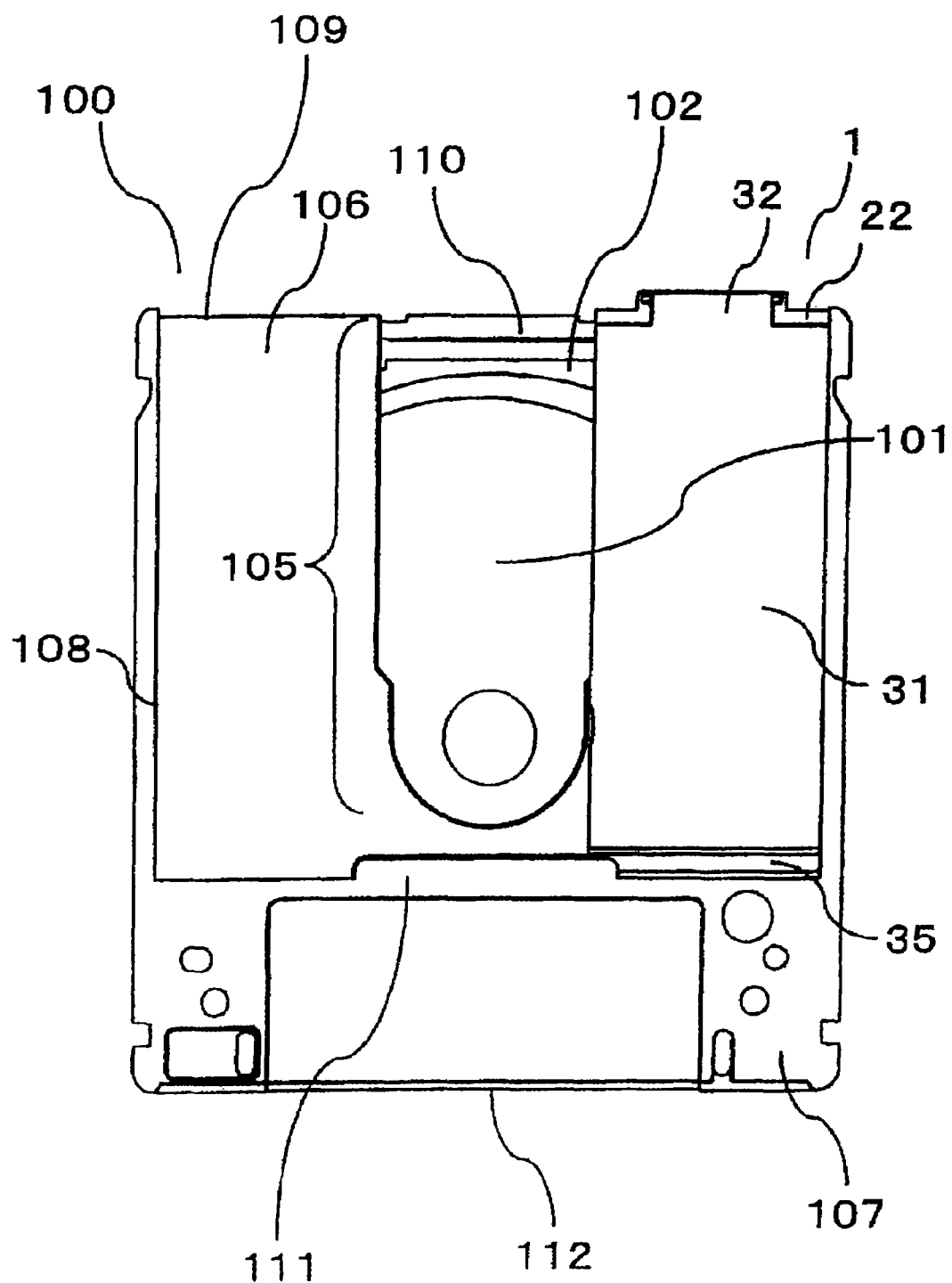
FIG. 12 is a plain view of the cartridge shown in FIG. 11 in which the shutter member is in an open state.

When the shutter member 1 of the cartridge is slid to an open position determination section 108, the window section 105 and/or the sliding surface 106 are not in contact with the window coverage section 31. Thus, the state where the window section 105 is opened can be obtained as shown in FIG. 12.

Thus, the shutter member 1 which can be applied to the cartridge of the present invention can be obtained, by fitting the base member 2 onto the case member 100 such that the base member 2 slides on the case member 100, and then inserting the rotary shafts 71 of the plate member 3 into the bearing sections 60 of the base member 2. Accordingly, the problems described in References 2 and 3 due to the welding cannot be caused. As a result, it is possible to provide a cartridge having extremely high slidability and an extremely high coverage of window section 105.

Figure 13:
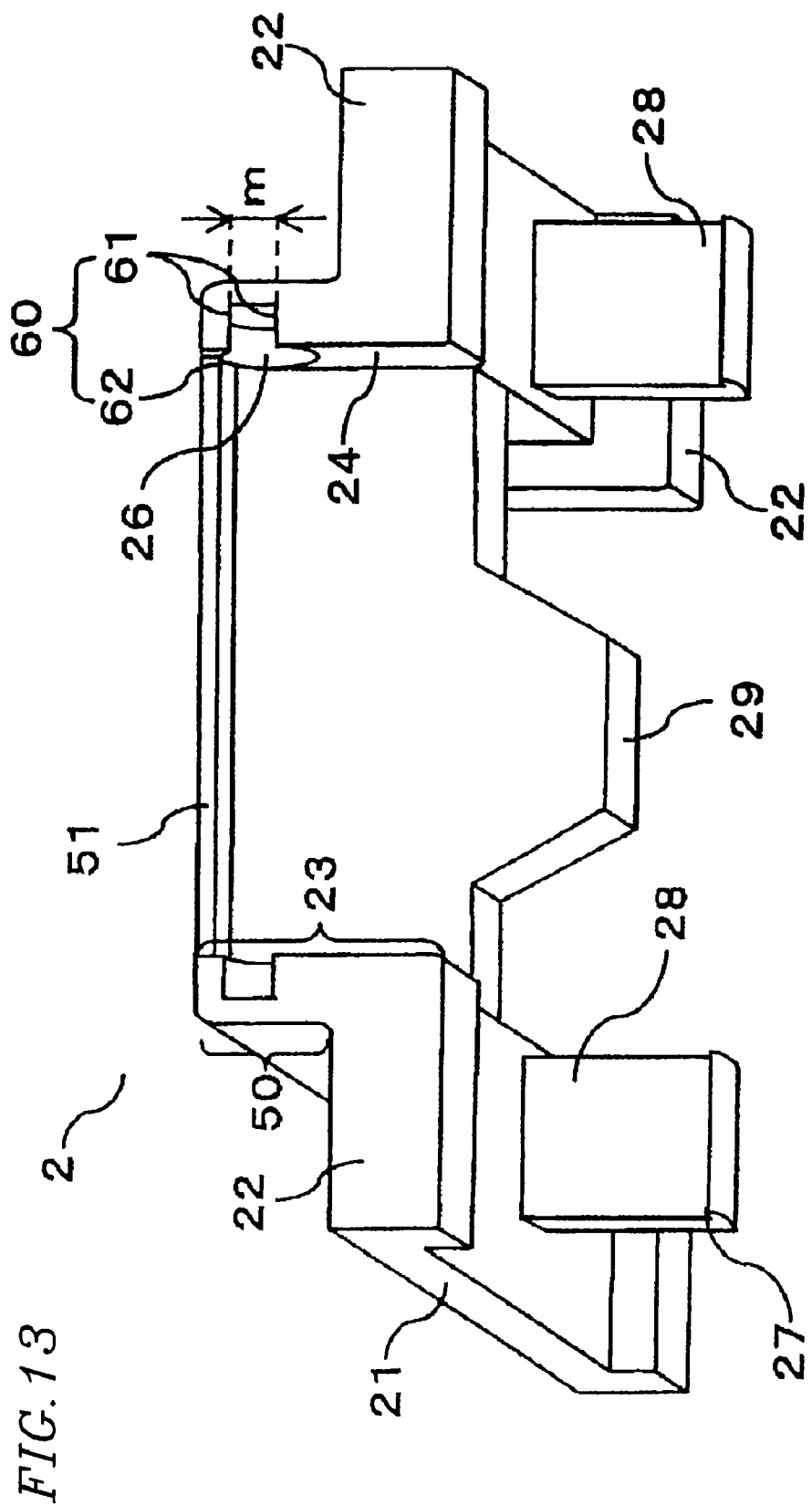
FIG. 13 is an oblique perspective view of the base member in another embodiment of the present invention.

It is possible to configure the base member 2 to have a structure that the shutter opener engaging section 50 of the base member 2 has a top panel 51 as shown in FIG. 13. This structure is preferable because it is possible to restrict the entry of foreign matter, such as dust, into the cartridge from the gap in engaging surface between the base member 2 and the plate member 3.

Figure 14:
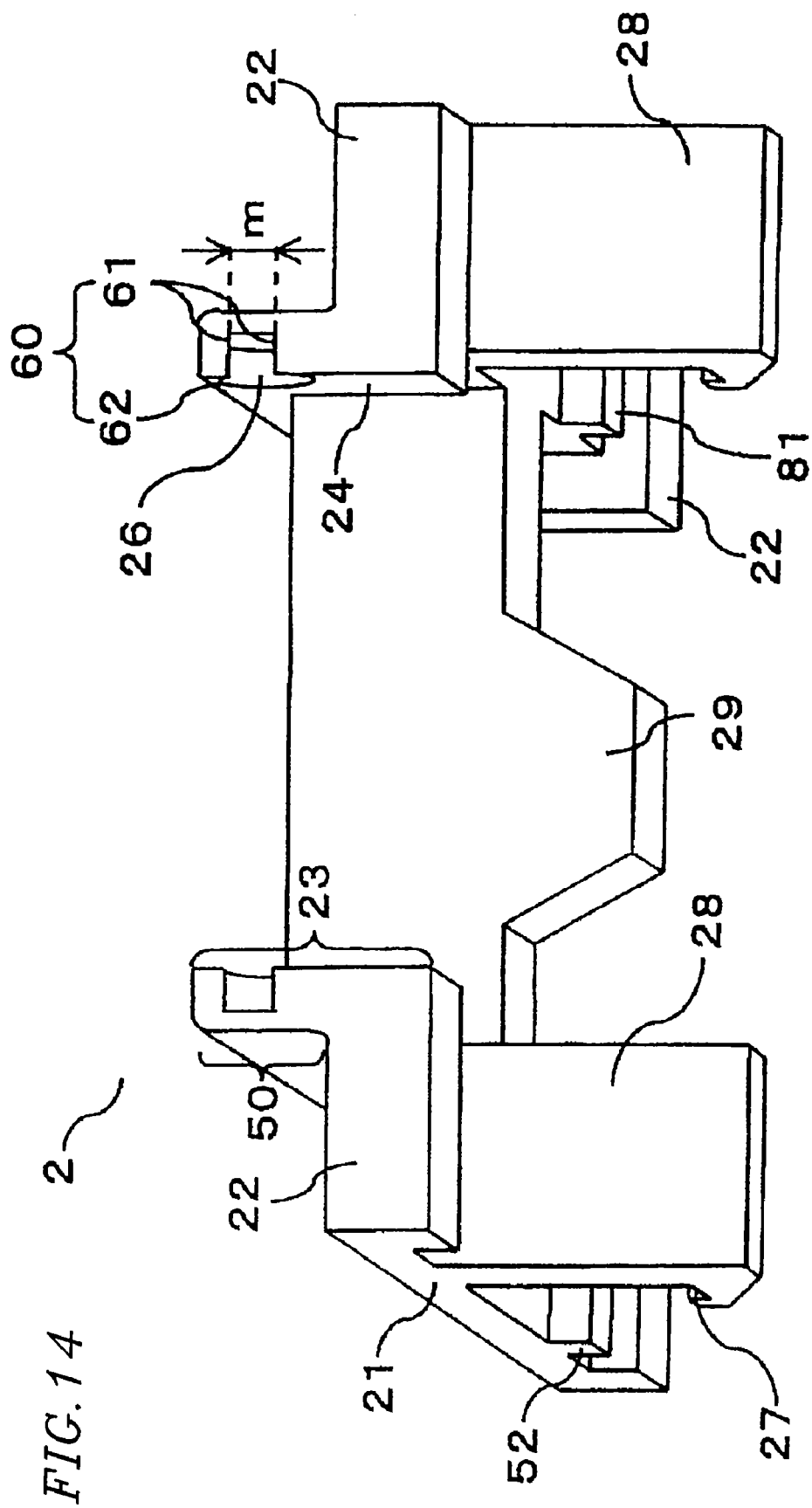
FIG. 14 is an oblique perspective view of the base member in another embodiment of the present invention.

Furthermore, it is possible to configure the base member 2 to have a structure that a position determination section 52 is provided spaced about the thickness of the locking rib 110 at the side of the hook 27 of the hook section 28 as shown in FIG. 14. This structure is preferable because the hook section 28 of the base member 2 can be securely engaged with the locking rib 110 of the case member 100.

In the embodiments described above, the base member 2 includes the bearing sections 25 and the plate member 3 includes the rotary shafts 33, and the base member 2 and the plate member 3 are engaged with each other by inserting the rotary shafts 33 of the plate member 3 into the bearing sections 25 of the base member 2. However, the present invention is not limited to this embodiment. For example, the base member 2 may include rotary shafts and the plate member 3 may include bearing sections, and the base member 2 and the plate member 3 may be engaged with each other by inserting the rotary shafts of the base member 2 into the bearing sections of the plate member 3.

Figure 15:
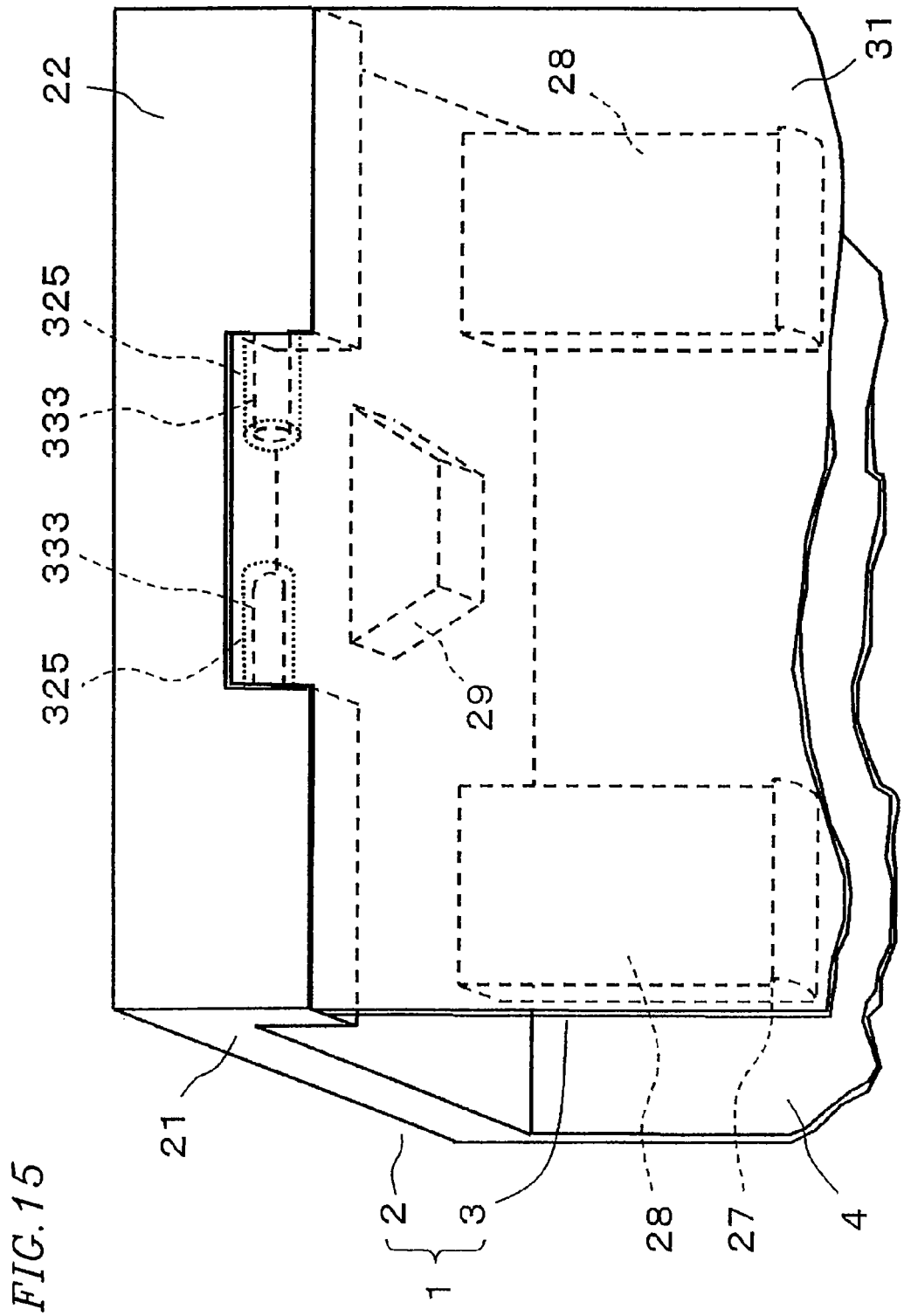
FIG. 15 is an oblique perspective view of the shutter member in another embodiment of the present invention.
Figure 16:
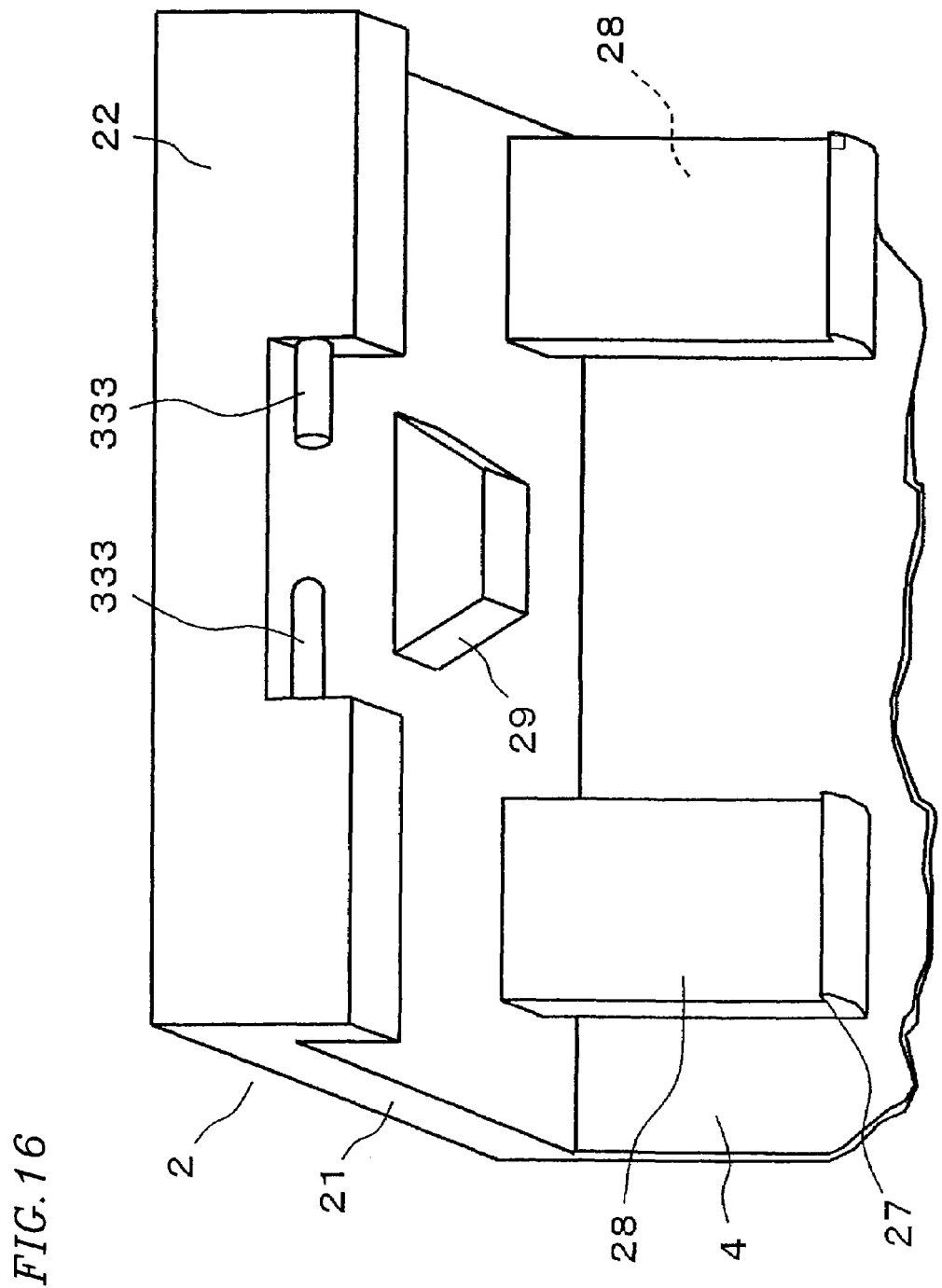
FIG. 16 is an oblique perspective view of the base member shown in FIG. 15.
Figure 17:
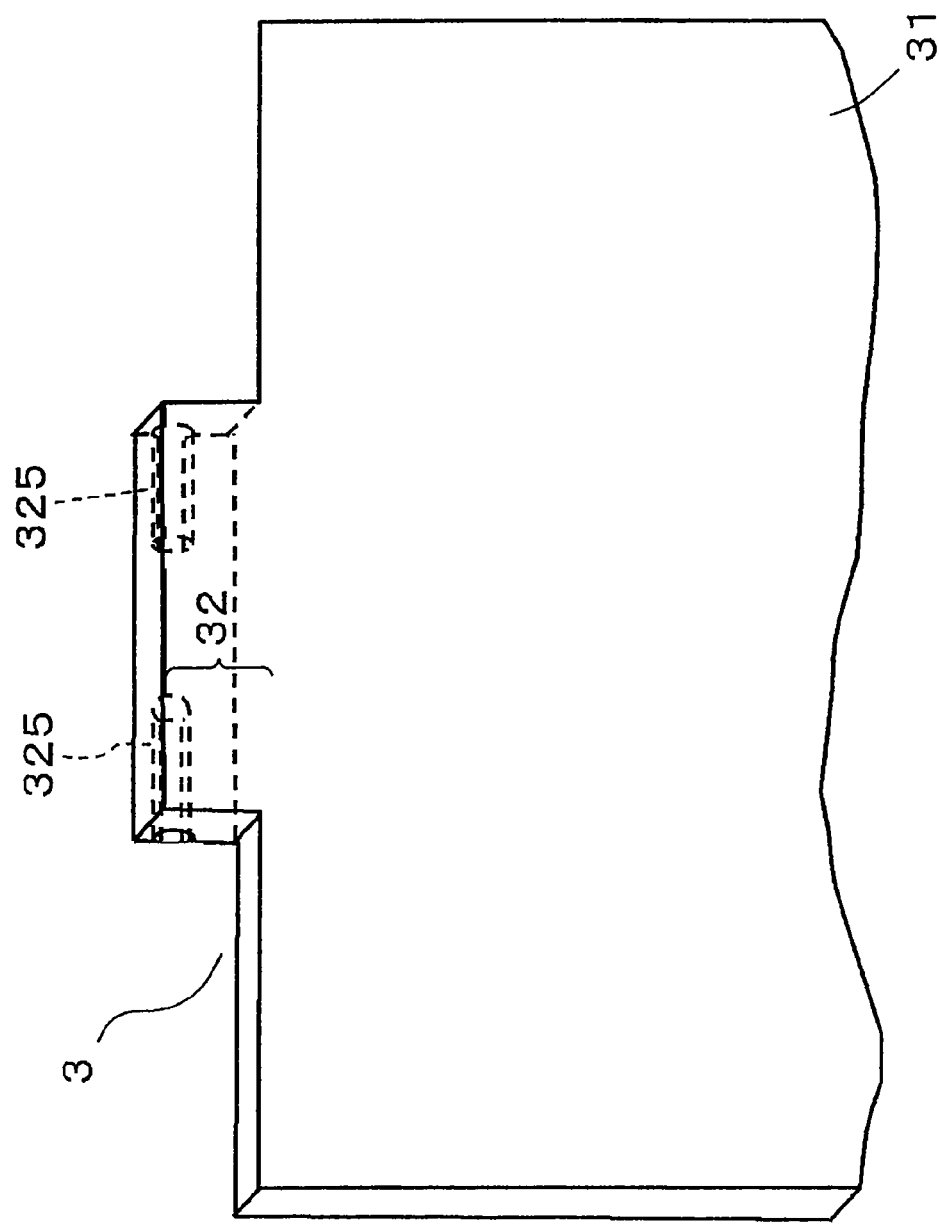
FIG. 17 is an oblique perspective view of the plate member shown in FIG. 15.
Figure 17:
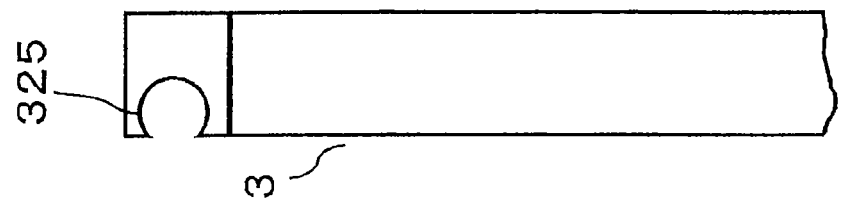
Figure 18:
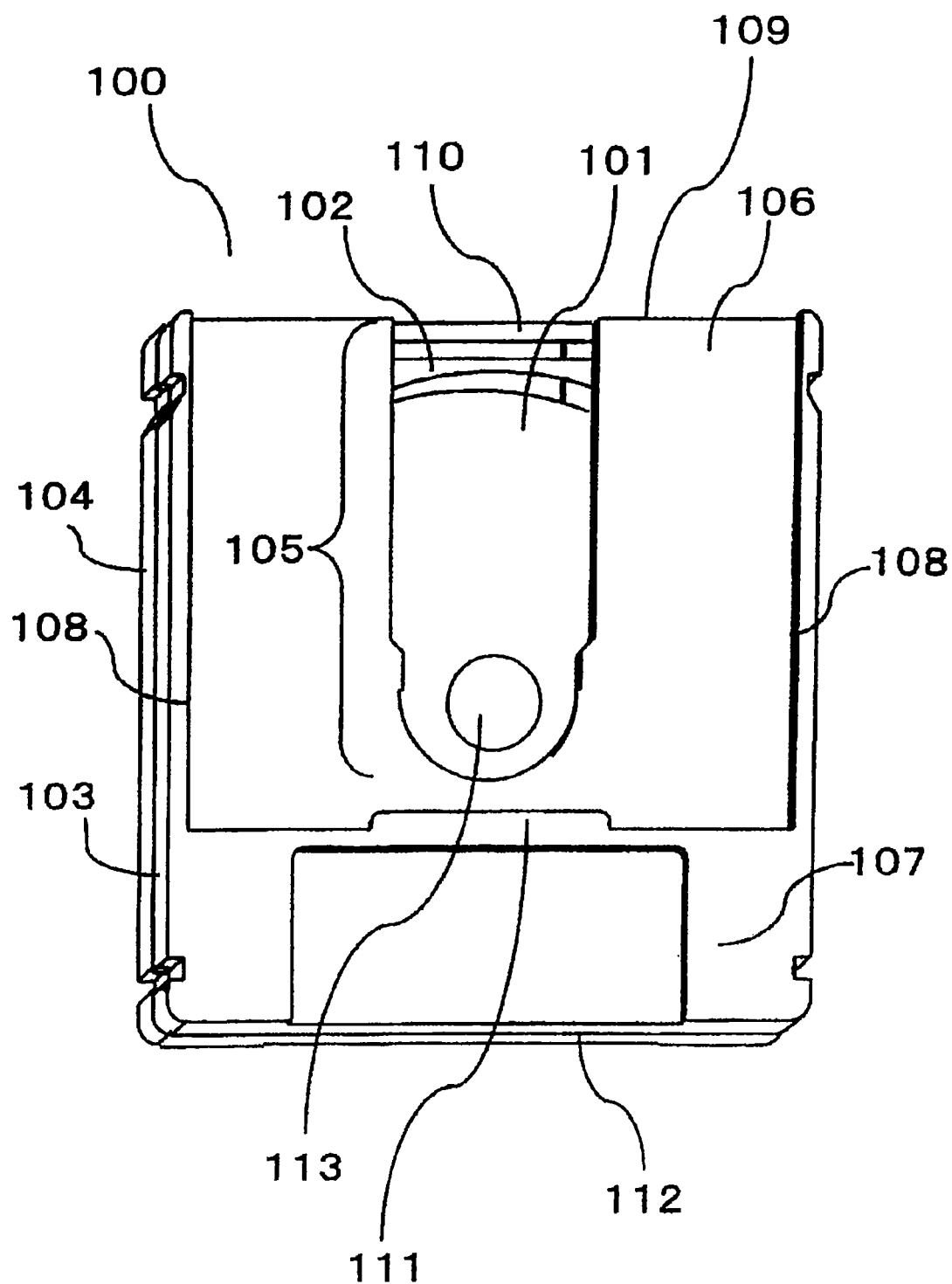
FIG. 18 is an oblique perspective view of the case member.
Figure 19:
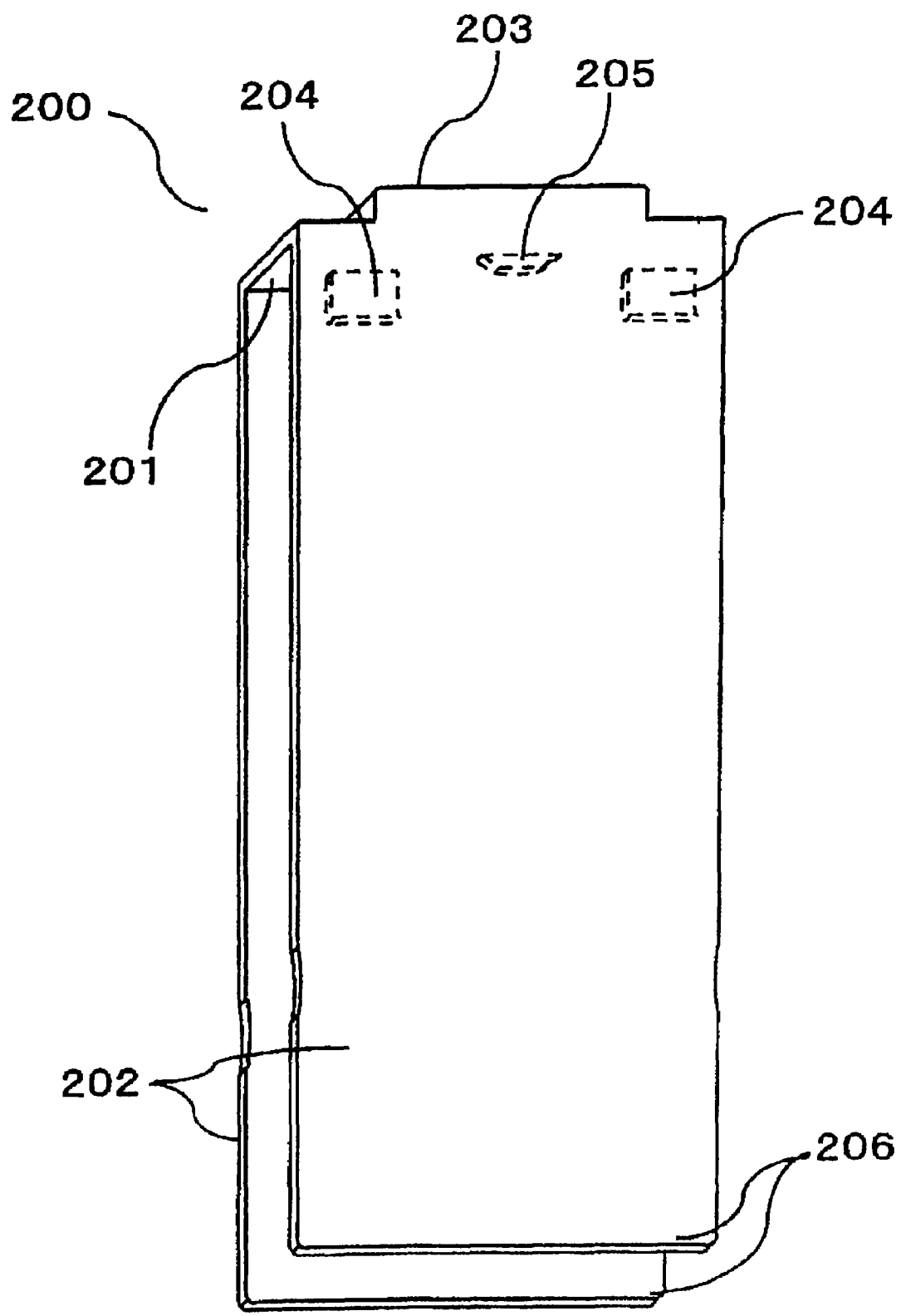
FIG. 19 is an oblique perspective view of one example of the conventional shutter member.
Figure 20A:
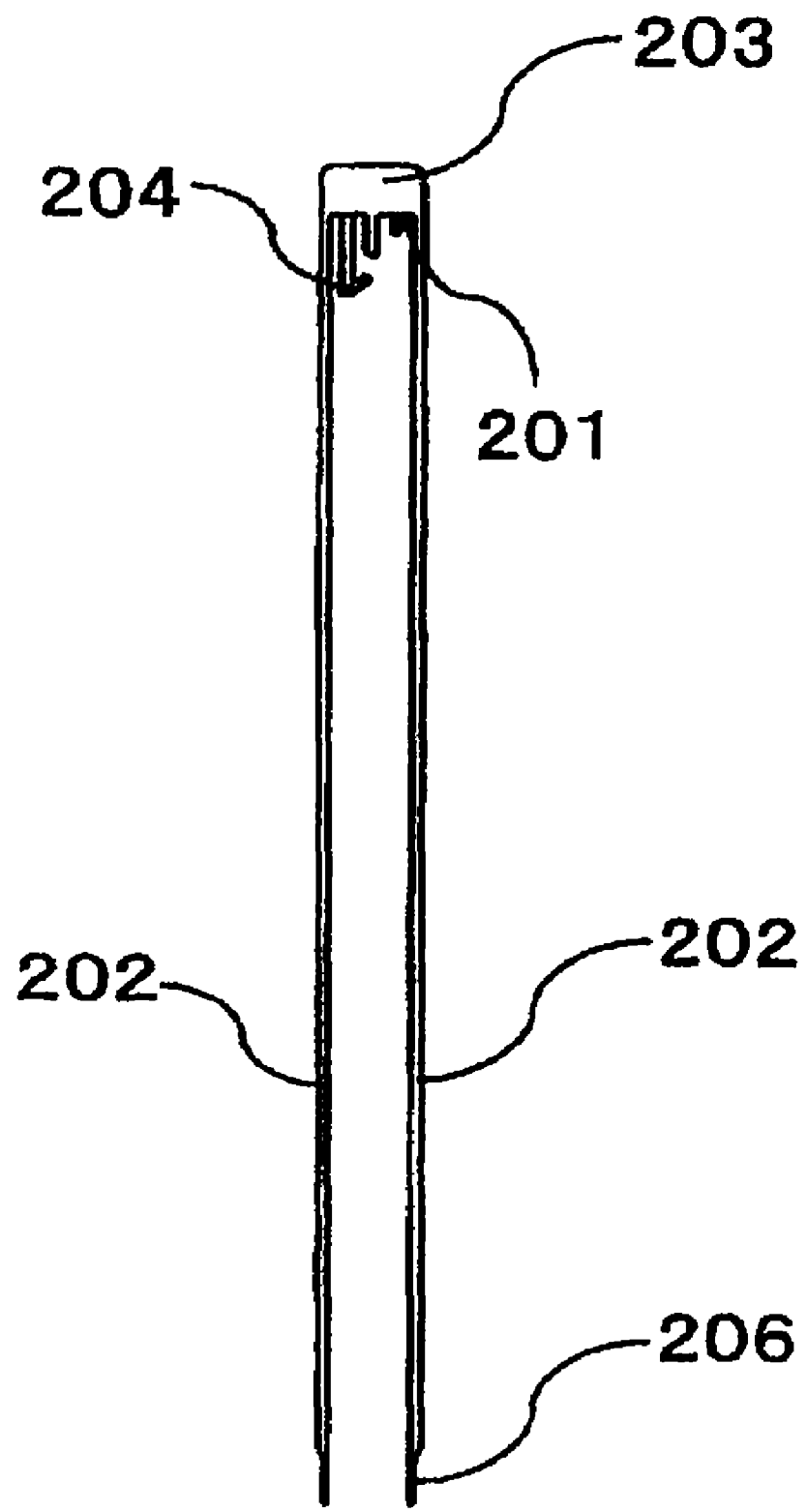
FIG. 20A is a side view of the shutter member in the normal state.
Figure 20B:
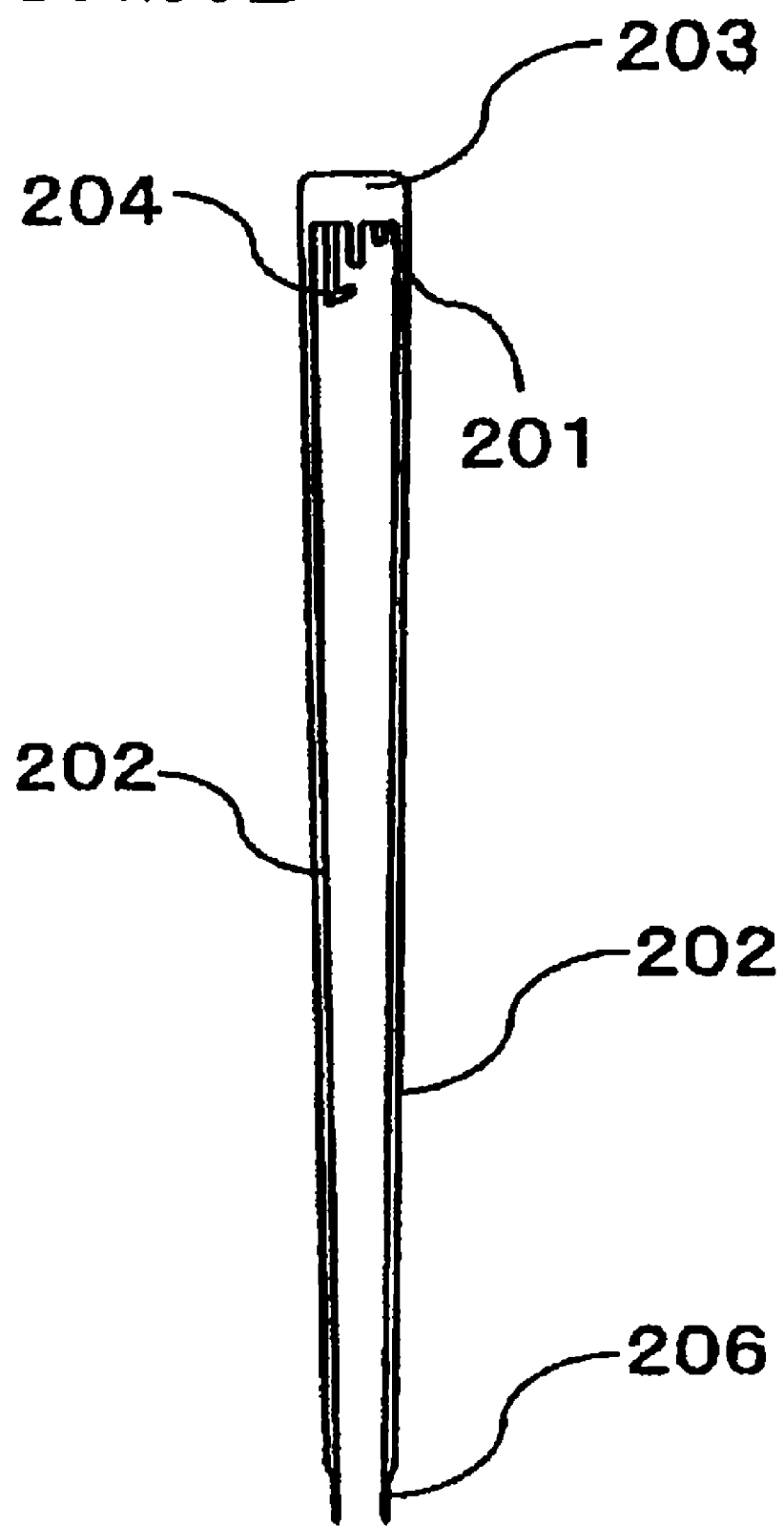
FIG. 20B is a side view of the shutter member with smaller angle.
Figure 20C:
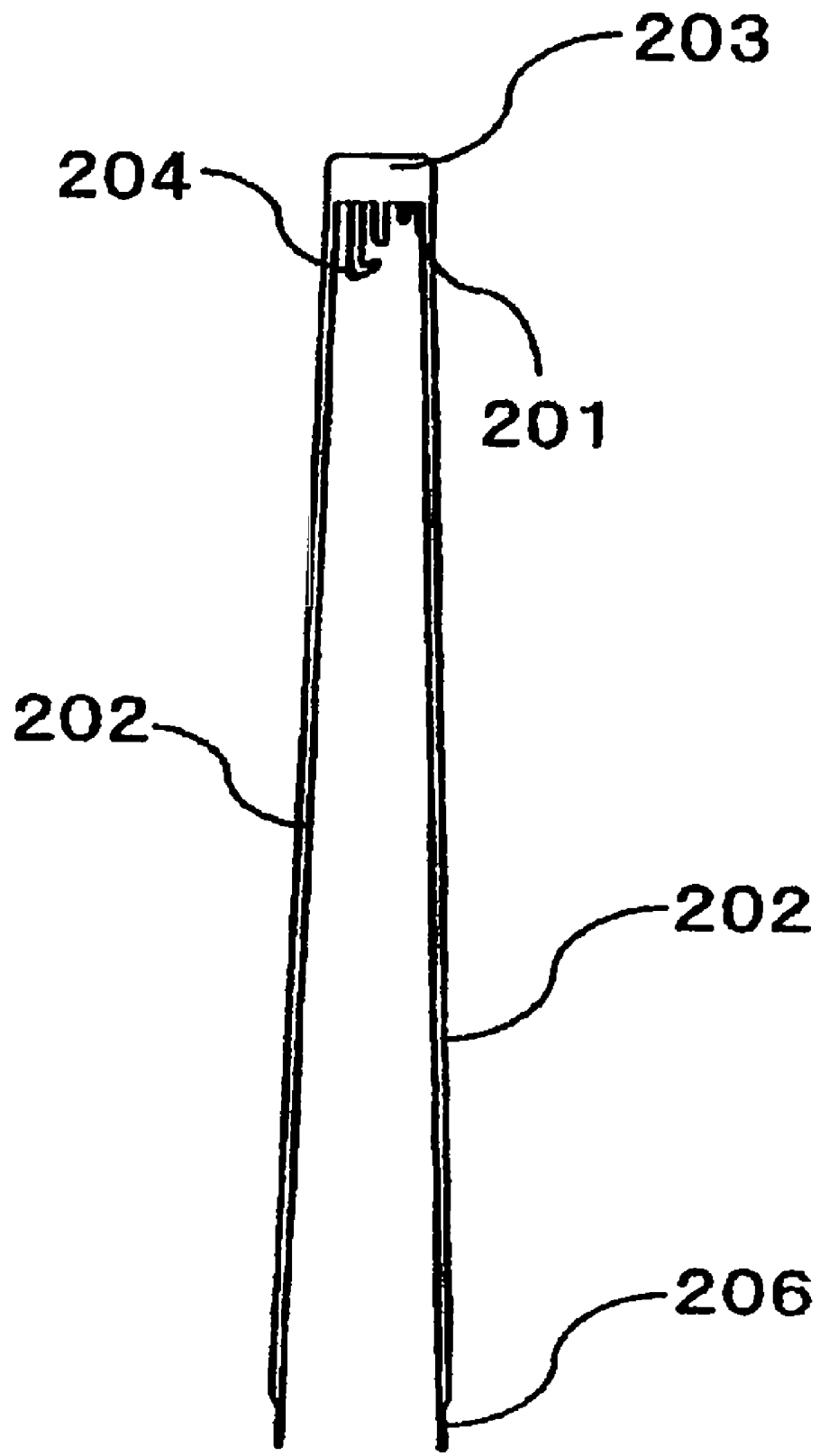
FIG. 20C is a side view of the shutter member with larger angle.

FIG. 15 is an oblique perspective view of another embodiment of the shutter member 1 which can be applied to the cartridge of the present invention. FIG. 16 is an oblique perspective view of the base member 2 shown in FIG. 15. FIG. 17 is an oblique perspective view of the plate member 3 shown in FIG. 15.

As shown in FIGS. 15 to 17, the base member 2 includes rotary shafts 333 and the plate member 3 includes bearing sections 325. In this case, it is possible that the base member 2 and the plate member 3 are engaged with each other by inserting the rotary shafts 333 of the base member 2 into the bearing sections 325 of the plate member 3 such that the plate member 3 can be rotated with respect to the base member 2.

In the cartridge according to the present invention, the base member 2 and the plate member 3 may be engaged with each other in any manner. As long as the base member 2 and the plate member 3 are engaged with each other such that the plate member 3 can be removed from the base member 2, any shutter member 1 including the base member 2 and the plate member 3 described above should be considered to be fallen within the scope of the present invention.

Furthermore, any cartridge including such a shutter member 1 should also be considered to be fallen within the scope of the present invention.

Thus, in the shutter member 1 according to the present invention, the base member 2 and the plate member 3 are engaged with each other such that the plate member 3 can be removed from the base member 2. Accordingly, if necessary, the plate member 3 can be removed from the base member 2. For example, in the state where the plate member 3 is removed from the base member 2, it is possible to clean up the information medium 101 by mounting a cleaning cap into the center hole 113 of the information medium 101 and by rotating the cleaning cap. In this case, the cleaning cap may be rotated either manually or mechanically. The fact that the information medium 101 may be easily cleaned is one of the advantages of the shutter member 1 is configured such that the plate member 3 can be removed from the base member 2.

As described above, the present invention is exemplified by the use of the preferred embodiments of the present invention. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

According to the present invention, it is possible to realize a cartridge having extremely high slidability of the shutter member. As a result, it is possible to accurately operate the recording/reproduction device which sends/receives information signal for the information medium stored in the cartridge.

We claim:

1. A shutter member used in a cartridge having a case member,
the case member including a medium storage section for storing an information medium having an information layer and a window section configured to allow at least a head to be inserted, the head being used to perform a recording operation or a reproduction operation for the information layer,
the shutter member comprising:
a base member operable to slide along a sidewall of the case member; and
a plate member engaged with the base member, which is operable to open/close the window section of the case member in accordance with a sliding motion of the base member, wherein the base member and the plate member are engaged with each other such that the plate member can be removed from the base member;

characterized in that one of the base member and the plate members includes rotary shafts and the other one comprises bearing sections, whereby the base member and the plate member are removably and rotatably engaged with each other by inserting the rotary shafts in the bearing sections.

2. A shutter member according to claim 1, wherein:

the base member includes bearing sections, the plate member includes rotary shafts, and the base member and the plate member are engaged with each other by inserting the rotary shafts of the plate member into the bearing sections of the base member such that the plate member can be rotated with respect to the base member.

3. A cartridge comprising a case member and a shutter member, the case member including:

a medium storage section for storing an information medium having an information layer; and a window section configured to allow at least a head to be inserted, the head being used to perform a recording operation or a reproduction operation for the information layer, the shutter member including:

a base member operable to slide along a sidewall of the case member; and a plate member engaged with the base member, which is operable to open/close the window section of the case member in accordance with a sliding motion of the base member, wherein the base member and the plate member are engaged with each other such that the plate member can be removed from the base member;

characterized in that one of the base member and the plate members includes rotary shafts and the other one comprises bearing sections, whereby the base member and the plate member are removably and rotatably engaged with each other by inserting the rotary shafts in the bearing sections.

4. A cartridge according to claim 3, wherein:

the base member includes bearing sections, the plate member includes rotary shafts, and the base member and the plate member are engaged with each other by inserting the rotary shafts of the plate member into the bearing sections of the base member such that the plate member can be rotated with respect to the base member.

5. A cartridge according to claim 4, wherein:

the base member includes:

a sliding flat plate section having a predetermined length along a sliding direction in which the base member slides along the sidewall of the case member and a predetermined width along a direction perpendicular to the sliding direction; and a sliding side plate section coupled to a side edge along the width direction of the sliding flat plate section, which has a cutout section at substantially the center along the length direction of the sliding flat plate section, the plate member includes:

a window coverage section for covering the window section; and an engaging protrusion section which protrudes from the window coverage section, wherein the rotary shafts are provided to protrude from a pair of edge walls which are parallel to the sliding direction of the engaging protrusion section, and the bearing sections are provided in the cutout section of the sliding side plate section.

6. A cartridge according to claim 5, wherein:

a pair of sliding side plate sections are coupled to the side edges in the width direction of the sliding flat plate section, and each of the pair of sliding side plate sections includes the cutout section.

7. A cartridge according to claim 5, further comprising:

a shutter opener engaging section which engages with a shutter opener during the open operation of the shutter member, wherein the cutout section of the sliding side plate section extends to the shutter opener engaging section.

8. A cartridge according to claim 5, wherein:

the rotary shaft has a shape including a pair of cut surfaces which is obtained by cutting the rotary shaft along the plane parallel to the window coverage section.

9. A cartridge according to claim 5, wherein:

the rotary shaft is provided to protrude from a rib of the engaging protrusion section.

10. A cartridge according to claim 5, wherein:

the window coverage section includes a sliding surface on which the case member slides, and a mat finish having fine depressions and protrusions is provided on the sliding surface.

11. A cartridge according to claim 5, wherein:

near an edge of the window coverage section perpendicular to the sliding direction, within a predetermined width of the window coverage section, either a depression away from the sliding surface of the case member on which the window coverage section slides or a taper portion where the thickness is gradually smaller in a direction towards the edges is provided.

12. A cartridge according to claim 5, wherein:

the material for the base member has at least one of a higher sliding property and a higher glass transition point, compared to the material for the plate member.

* * * * *